US006657359B1

(12) United States Patent
Hoen et al.

(10) Patent No.: US 6,657,359 B1
(45) Date of Patent: Dec. 2, 2003

(54) METHOD OF DRIVING AN ELECTROSTATIC ACTUATOR WITH SPATIALLY-ALTERNATING VOLTAGE PATTERNS

(75) Inventors: Storrs Hoen, Brisbane, CA (US); Carl Taussig, Redwood City, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 943 days.

(21) Appl. No.: 09/387,204

(22) Filed: Aug. 31, 1999

Related U.S. Application Data

(62) Division of application No. 08/818,209, filed on Mar. 14, 1997, now Pat. No. 5,986,381.

(51) Int. Cl.[7] ............................................... H02N 1/00
(52) U.S. Cl. ..................................................... 310/309
(58) Field of Search ........................................ 310/309

(56) References Cited

U.S. PATENT DOCUMENTS

| 5,523,639 A | * | 6/1996 | Okamoto et al. | ........... 310/309 |
| 5,585,683 A | * | 12/1996 | Higuchi et al. | ............. 310/309 |

FOREIGN PATENT DOCUMENTS

| JP | 2-211078 | * | 8/1990 | .................. 310/309 |
| JP | 04-368479 | * | 12/1992 | .................. 310/309 |

OTHER PUBLICATIONS

Translation of JP 5–122,948, Inventor: Suematsu, May 1993.*

* cited by examiner

Primary Examiner—Karl Tamai
(74) Attorney, Agent, or Firm—Ian Hardcastle

(57) ABSTRACT

An electrostatic actuator having a first member and a second member. The first member has a first opposed surface that includes an array of driven electrodes. The driven electrodes have a pitch $p_r$. The second member has a second opposed surface and includes an array of drive electrodes. A support positions the first member adjacent the second member with the first opposed surface spaced apart from the second opposed surface by a spacing d. The ratio of the spacing and the pitch should be less than eight, and is preferably less than 2.25. The support permits the first member to move relative to the second member, or vice versa. A voltage source establishes a substantially alternating voltage pattern on the array of driven electrodes. An electrode control establishes a substantially alternating voltage pattern on the array of drive electrodes, and selectively imposes a local disruption on the substantially alternating voltage pattern on the array of drive electrodes to move the movable one of the first member and the second member relative to the other.

7 Claims, 9 Drawing Sheets

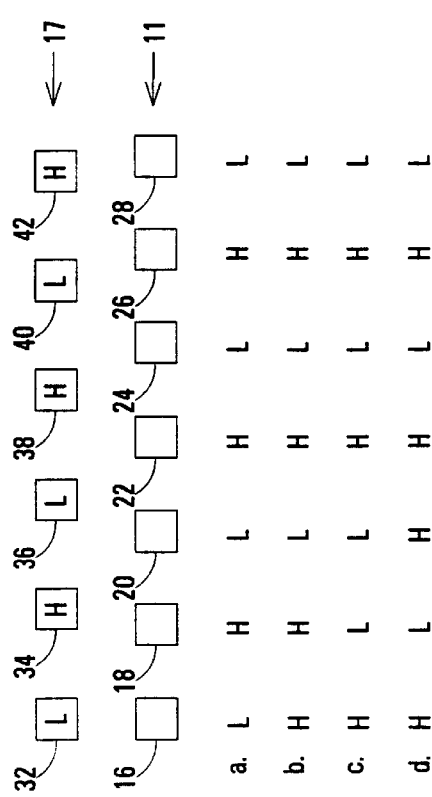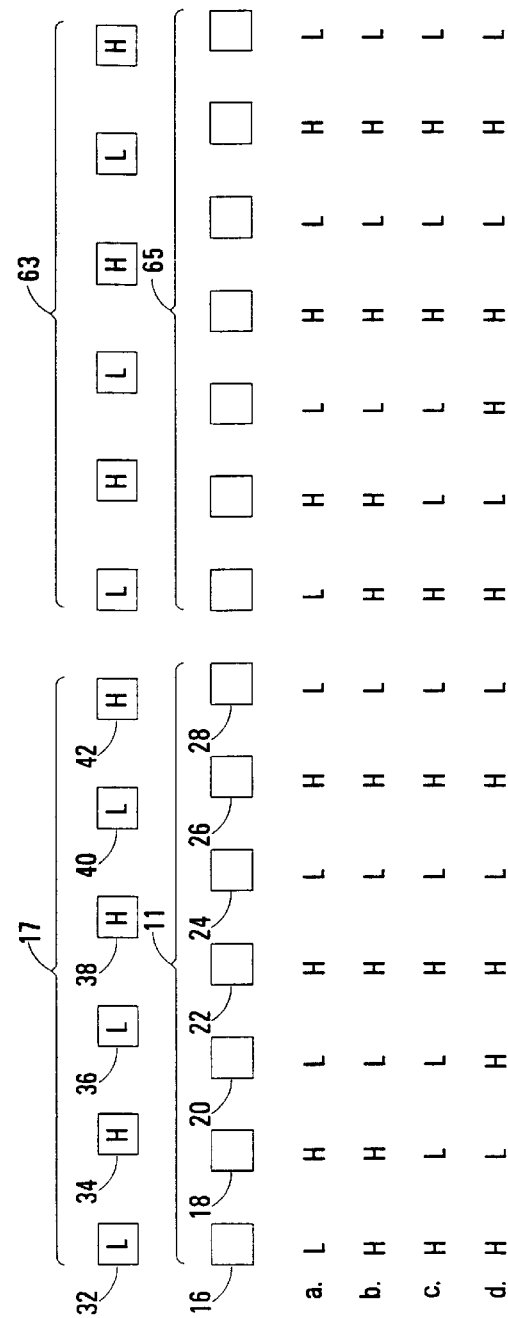

METHOD OF DRIVING AN ELECTROSTATIC ACTUATOR WITH SPATIALLY-ALTERNATING VOLTAGE PATTERNS

CROSS REFERENCE TO RELATED APPLICATION(S)

This is a divisional of application Ser. No. 08/818,209 filed on Mar. 14, 1997 now U.S. Pat. No. 5,986,381.

FIELD OF THE INVENTION

The invention relates generally to electrostatic actuators and more particularly to micromachined electrostatic actuators.

BACKGROUND OF THE INVENTION

With the advent of micromachining techniques, there has been renewed interest in electrostatic actuators. Electrostatic actuators achieve high energy densities and can be manufactured using straightforward manufacturing techniques. Electrostatic actuators have been used to position optical devices, to operate switches, and to turn small gears. For advanced data storage devices and other applications, micromachined actuators that have a large travel, whose positioning can be controlled with great precision, and that operate in response to a low actuation voltage are needed. These requirements are not met by known micromachined electrostatic actuators.

A micromachined electrostatic actuator that satisfies some of the above requirements is described by Trimmer and Gabriel in *Design Considerations for a Practical Electrostatic Micro-Motor*, SENSORS AND ACTUATORS, Vol. 11, pages 189–206 (1987) and in U.S. Pat. No. 4,754,185. These documents describe an electrostatic actuator in which a grounded moveable silicon substrate or "rotor" is moved relative to a fixed silicon substrate or "stator." The stator has several sets of electrodes on its surface, one of which is held at a voltage different from ground in order to position the rotor. Stepped motion is provided by setting the pitches of the stator and rotor electrodes in a vernier relationship. The rotor electrodes all having the same voltage, i.e., ground potential, significantly eases fabrication of the device.

However, the electrostatic actuator described by Trimmer and Gabriel does not meet all of the requirements set forth above. For example, an actuation voltage of approximately 100 V is required to exert a force on the rotor in the direction parallel to the plane of the rotor surface (an "in-plane force") in the range of forces required to operate an advanced memory device. This actuation voltage is outside the range of voltages that can be controlled using conventional MOS integrated circuits. Moreover, the in-plane force is accompanied by an out-of-plane force perpendicular to the plane of the rotor. The out-of-plane force attracts the rotor towards the stator and is as much as ten times greater than the in-plane force.

The large attractive out-of-plane force places significant constraints on the suspension used to maintain the spacing between the rotor and stator. For conventional-size electrostatic actuators, spacers, bearings and lubricating layers may be used to support the rotor against the attractive force. However, for micro-scale structures, it is more difficult to provide an effective way of maintaining the spacing between the rotor and stator without large frictional forces that adversely affect operation.

Folded beam flexures are most commonly used in micromachined devices to support the rotor above the stator. Advanced data storage applications require actuators that can travel 25 $\mu$m laterally while maintaining the rotor-stator spacing to an accuracy of 0.1 $\mu$m. If the ratio of the out-of-plane force to the in-plane force is near 10, as in the electrostatic actuator described by Timmer and Gabriel, then a 2 $\mu$m-wide beam flexure would need to be at least 100 $\mu$m tall to have sufficient out-of-plane stiffness. Such a structure is extremely difficult to fabricate using conventional processing.

A first approach to mitigate the effects of the out-of-plane attractive forces in micromachined devices is to use two stationary electrode plates on opposite sides of a movable plate. By selecting the appropriate electrode configuration, it is possible to levitate the moving plate at a relatively stable position between the two stationary plates. However, this approach requires exacting process control during fabrication and/or assembly.

A second known approach applicable to micromachined devices is to use the weight of the movable substrate to counteract the attractive force. However, since this approach does not work if the electrostatic actuator is tilted, its usefulness is significantly restricted.

In both of the approaches discussed above, the rotor electrodes are all held at a single voltage. Macro-scale electrostatic actuators are known that have three or more voltages present on both the stator and rotor. One approach using a three-phase oscillating voltage pattern is described in U.S. Pat. No. 5,534,740 of Higuchi et al. This approach can produce a very large in-plane force. However, the large in-plane force is accompanied by a large out-of-plane force about four times greater than the in-plane force. Oscillating voltages of approximately 200 volts are required to generate an in-plane force of sufficient magnitude to overcome friction in the suspension elements. Therefore, this approach will not conveniently scale to a micromachined device because of the large out-of-plane force and the requirement to connect three oscillating voltages to the rotor electrodes. Making electrical connections to a moveable rotor is difficult, particularly for a micromachined rotor, so it is desirable to minimize the number of voltages present on the rotor electrodes. In addition, the way in which the voltages vary with time should be made as simple as possible.

Some conventional electrostatic actuators provide precise position control and a large range of travel, but cannot simply be scaled for use in micromachined electrostatic actuators. This is because these actuators operate with actuation voltages greater than those that can be controlled using conventional MOS integrated circuits, generate an out-of-plane force that is too large relative to the in-plane force, and require too many electrical connections to be made to the rotor. What is needed is an electrostatic actuator and a way controlling an electrostatic actuator that provides precise positioning and that can be controlled using conventional CMOS integrated circuits. What is also needed is such an electrostatic actuator that can be fabricated using micromachining techniques that employ processing similar to that used to make integrated circuits.

SUMMARY OF THE INVENTION

The above requirements are met by a micromachined electrostatic actuator having a structure that will be described in more detail below. An alternating voltage pattern is imposed on electrodes located on opposed electrode surfaces of both the rotor and the stator. The actuator provides a significantly lower out-of-plane force for a given in-plane force. The actuator will provide an in-plane force in the range of forces required in an advanced memory device when driven with actuation voltages in the range that can be controlled using conventional MOS integrated circuits. The actuator can be manufactured using micromachining techniques that employ processing similar to that used to make integrated circuits.

The electrostatic actuator includes a stator having a first linear array of electrodes disposed along an opposed surface and a rotor having a second linear array of electrodes disposed along an opposed surface opposite the opposed surface of the stator. The opposed surfaces of the stator and rotor are spaced apart by a spacing d. The rotor is supported relative to the stator to allow to rotor to move in the in-plane direction, parallel to the opposed surfaces. Initially, an alternating voltage pattern is imposed on the electrodes on both the rotor and stator. For example, a first voltage level is applied to every other electrode in each array, and a second voltage level, different from the first voltage level, is applied to each electrode adjacent the electrodes at the first voltage level. By introducing a local disruption into the alternating voltage pattern on the stator, the rotor can be moved in the in-plane direction by a precise distance.

The alternating voltage patterns will not by themselves reduce the out-of-plane-attractive force to a level comparable with the large in-plane force. To reduce the out-of-plane force for a given in-plane force, the pitch/spacing ratio p/d, which is the ratio between the electrode pitch p of the rotor and the spacing d between the opposed surfaces of the rotor and the stator must be within an optimal range. A usably low out-of-plane force results when the pitch/spacing ratio is less than eight. The out-of-plane force is minimized for a given in-plane force when the pitch/spacing ratio is less than about 2.25.

In a preferred embodiment, in-plane motion is provided by a stepper driven array of electrodes located on the opposed surface of the rotor and a corresponding stepper drive array of electrodes located on the opposed surface of the stator. Each driven array has an even number $n_r$ of rotor electrodes and each drive array has an odd number $n_s$ of stator electrodes, so that $n_s=n_r\pm 1$. The ratio of the pitch of the driven electrodes to the pitch of the stator electrodes is $n_s/n_r$.

The drive electrodes may alternatively be located on the rotor, in which case, the driven electrodes are located on the stator. In this case, each driven array has an even number of stator electrodes and each drive array has an odd number of rotor electrodes, differing in number from the number of stator electrodes by one. The ratio of the pitch of the driven electrodes to the pitch of the stator electrodes is equal to the ratio of the number of rotor electrodes and the number of stator electrodes.

As described above, an alternating voltage pattern initially exists on the electrode arrays located on each of the stator and the rotor. The alternating voltage pattern on the stator alternates between the first voltage and the second voltage, where the first voltage is applied to the first electrode in the stator array. In-plane movement of the rotor is induced by locally disrupting the initial alternating voltage pattern by switching the voltage on the first electrode from the first voltage to the second voltage. Further in-plane movement may be induced by switching the second stator electrode to the first voltage, leaving the voltage on the first electrode unchanged at the second voltage.

The mode of operation just described subjects the rotor to an attractive force directed toward the stator. However, unlike the case in which all the rotor electrodes are held at the same voltage, the magnitude of the out-of-plane attractive force can be reduced by a factor of approximately ten to a level approximately equal to the maximum in-plane force applied to the rotor. If the rotor is suspended by beam flexures, this reduction in the out-of-plane force by a factor of ten reduces the aspect ratio of the beam flexures to one that can be easily manufactured by conventional techniques.

A further advantage of the electrostatic actuator according to the invention is that it provides a large in-plane force for a given actuation voltage. The in-plane force may be as large as one third of the attractive force between the two plates of an equivalently-sized parallel-plate capacitor.

The electrostatic actuator according to the invention has another advantage in that the in-plane position of the rotor can be progressively stepped without changing the alternating voltage pattern imposed on the rotor electrodes. As a result, the stepping rate is not limited by the dynamic electrical characteristics of the rotor. Moreover, only one stator electrode in each set of stator electrodes need be switched at any one time to step the rotor position. This imposes a minimum of timing constraints on the stator voltage control circuitry.

The electrostatic actuator according to the invention can be used to provide displacements in both the in-plane and out-of-plane directions, i.e., in directions respectively parallel and perpendicular to the opposed surfaces of the stator and rotor. Opposed electrodes on which an alternating voltage pattern is imposed can also be used to exert an out-of-plane force on the rotor. Such out-of-plane force can be used to offset the out-of-plane attractive force exerted on the rotor by the electrodes generating the in-plane force. Additionally or alternatively, the out-of-plane force can be used to control the position of the rotor in the out-of-plane direction.

The out-of-plane force is preferably provided by an array of levitator drive electrodes located on the opposed surface of the stator and an array of levitator driven electrodes located on the opposed surface of the rotor. The arrays of levitator drive electrodes and levitator driven electrodes have equal pitch. The alternating voltage patterns are imposed so that levitator electrodes in the higher-voltage state on the rotor are aligned with the levitator electrodes in the higher voltage state on the stator. With this arrangement, the rotor is repelled from the stator. The out-of-plane force can be controlled by varying the voltages on either or both of the rotor or stator. The array of levitator drive electrodes may alternatively be located on the opposed surface of the rotor and the array of levitator driven electrodes may alternatively be located on the opposed surface of the stator.

Electrode arrays primarily generating an in-plane force ("stepper electrode arrays") and electrode arrays generating an out-of-plane force ("levitator electrode arrays") can be combined to provide additional functionality. For example, a number of similar electrode arrays can be used to increase the force applied by a single electrode array. Moreover, a first stepper electrode array disposed perpendicular to a second stepper electrode array can move the rotor in either or both of two perpendicular in-plane directions. A levitator electrode array disposed perpendicular to a stepper electrode array can be used to offset the attractive out-of-plane force generated by the stepper electrode array. Finally, parallel stepper electrode arrays with different pitches can be used to exert an in-plane force on the rotor without any associated out-of-plane force.

The out-of-plane force exerted by a stepper array may also be reduced by filling the space between the rotor and stator with solid or fluid dielectrics.

One half of the electrodes in the rotor array may be replaced by a conductive plane set to a predetermined voltage, such as ground potential. This conductive plane forms "effective" electrodes between adjacent physical electrodes. For example, a conductive plane may be formed, and may be covered by an insulating layer on which a linear array of electrically-interconnected physical electrodes is located. Each region of the conductive plane between adjacent physical electrodes functions as an effective electrode. S The alternating voltage pattern is established by setting the electrically-interconnected physical electrodes to a voltage different from that of the conductive plane.

The drive electrodes in the stepper array are preferably connected to the same pair of voltage levels as the corresponding driven electrodes, although additional positioning accuracy can be provided if the electrode whose voltage is changed to disrupt the alternating voltage patten is connected to a voltage intermediate between the pair of voltage levels.

Because of the high voltage-to-in-plane-force conversion efficiency of the electrostatic actuator according to the invention, the pair of voltages applied the electrodes to impose the alternating voltage pattern may be selected to provide compatibility with conventional MOS circuits. Voltage pairs differing by less than 20 V will provide rapid movement of the rotor over a 50 $\mu$m range.

Throughout this disclosure, the term "rotor" is used to describe the movable part of the actuator, irrespective of whether the moveable part actually moves, and irrespective of whether it moves laterally or rotates. The embodiments described below can be directly employed in both rotary and linear actuators. In rotary electrostatic actuators, the electrodes of the stepper arrays are deposed radially about the center of rotation, and the electrodes of the levitation arrays are concentric with the center of rotation.

Arrays of sense electrodes may additionally or alternatively be located on the opposed surfaces of both the rotor and the stator to generate electrical signals indicating the position of the rotor. Corresponding sense arrays on the rotor and the stator have equal pitch. An alternating voltage pattern is applied to the sensor drive array, which is preferably located on the rotor, the voltage pattern induced in the sensor driven array preferably located on the stator is detected, and the position of the rotor is determined from the voltage pattern.

As noted above, the driven role of the rotor-may be interchanged with the driving role of the stator for the stepper and levitator electrodes, and the driving role of the rotor may be interchanged with the driven role of the stator for the sensor electrodes.

As mentioned above, a usably-low out-of-plane force is obtained when the pitch/spacing ratio, p/d, is less than eight, and the out-of-plane force for a given in-plane force is minimized when the pitch/spacing ratio is less than 2.25. When the pitch/spacing ratio is less than 2.25, the in-plane force is maximized and the attractive out-of-plane force is minimized for a given actuation voltage.

Because the alternating voltage pattern on the rotor does not need to change with time, the electrostatic actuator according to the invention will also operate when the alternating voltage pattern is established on the rotor opposed surface in some other way. For example, the alternating voltage pattern may be established by electrostatic charge deposited on the opposed surface, by a poled ferroelectric located on the opposed surface or by a strain field established in a piezoelectric material located on the opposed surface. To describe these alternatives, the relationship to maximize the in-plane force in terms of the spacing d can be stated in terms of the primary spatial wavelength $\lambda$ of the voltage distributions on the opposed surfaces of the rotor and the stator. This more analytic description is also necessary for an accurate description of the electrostatic actuator when the voltage pattern imposed on the electrodes is not exactly an alternating pattern, or when intermediate voltage levels are applied to some of the electrodes.

When the operation of the electrostatic actuator is described in terms of the primary spatial wavelength, the relationship to maximize the in-plane force in terms of the spacing d can be stated as a requirement that ratio of the primary spatial wavelength $\lambda$ to the spacing d, i.e., the spatial wavelength/spacing ratio, be less than 4.5. If the voltage pattern is strictly alternating and the pitch of the electrodes is uniform and equal to p, the primary spatial wavelength is simply $2p$, and the constraint on $\lambda$ is identical to the constraint on p. If the voltage pattern is not strictly alternating, such as occurs when the alternating voltage pattern on the stator is locally disrupted to change the position of the rotor, then the primary spatial wavelength $\lambda$ is determined by calculating a Fourier transform of the voltage distribution.

The primary advantage of the electrostatic actuator according to the invention is that a voltage compatible with convention MOS circuits will generate an in-plane force sufficiently large to move the rotor relative to the stator over distances of several tens of microns, and that the out-of-plane force generated as a side effect of generating the in-plane force is small enough to allow conventionally-fabricated folded beam flexures to support the rotor. A second advantage is that only two voltages need to be connected to the rotor, which enables the rotor to be fabricated with a minimum number of electrical interconnects. Moreover, since the voltages on the rotor are static, these electrical interconnects can have a relatively high impedance. Simplified electrical interconnects reduce the process complexity and minimize the effects of residual mechanical strains resulting from the use of dissimilar materials.

BRIEF DESCRIPTION OF THE DRAWINGS

FIG. 3 is a plot of the normalized forces applied to the rotor shown in

FIG. 2 as functions of the in-plane position of the rotor.

FIG. 6 shows the voltage states for operating the electrostatic actuator shown in FIG. 1.

FIG. 7 shows the voltage states of adjacent electrode arrays of the electrostatic actuator shown in FIG. 1.

DETAILED DESCRIPTION OF THE INVENTION

I. Description of the Basic Embodiment

Figure 1:
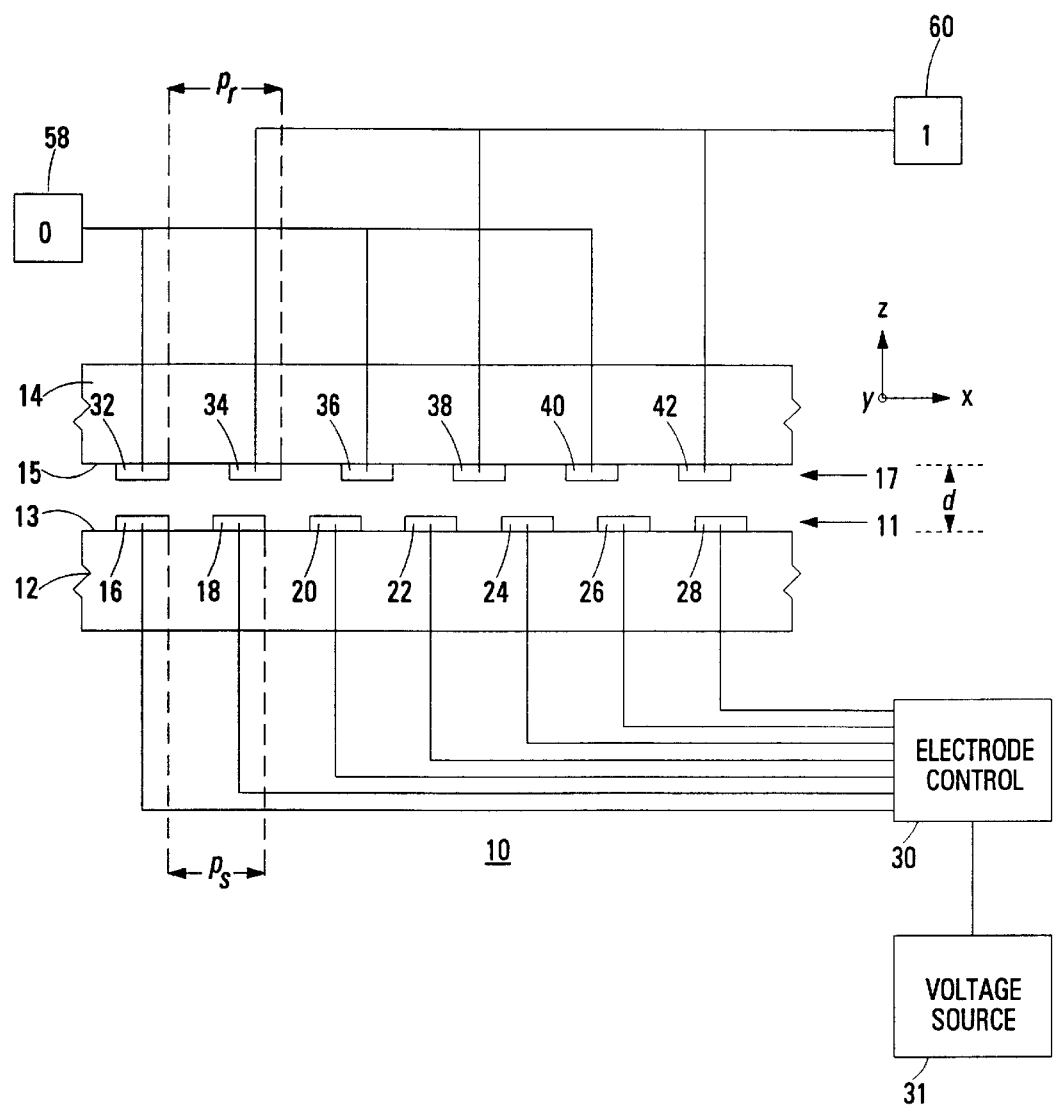
FIG. 1 is a schematic side view of the basic embodiment of the electrostatic actuator according to the invention.

A basic embodiment of the electrostatic actuator 10 according to the invention is shown schematically in FIG. 1. The structure of this actuator is characteristic of the embodiments that will described below. The electrostatic actuator includes the stator 12 and the rotor 14. The stator includes the plane opposed surface 13 along which the linear array 11 of stator electrodes 16, 18, 20, 22, 24, 26 and 28 is disposed. The rotor includes the plane opposed surface 15 opposite the opposed surface 13 of the stator. Disposed along the opposed surface 15 is the linear array 17 of rotor electrodes 32, 34, 36, 38, 40 and 42. The stator electrodes and the rotor electrodes are each elongate in a plane perpendicular to the plane of the drawing.

The rotor 14 is supported relative to the stator 12 so that the opposed surface 13 of the stator is spaced apart from the opposed surface 15 of the rotor by the spacing d. The embodiment shown in FIG. 1 has only the single array 11 of stator electrodes and the single array 17 of rotor electrodes. Practical embodiments may have arrays of electrodes concatenated on the stator and the rotor to increase the in-plane force exerted on the rotor, and may have additional arrays of electrodes to generate an out-of-plane force and to sense the position of the rotor. Such embodiments will be described in more detail below.

In the embodiment shown in FIG. 1, the voltage pattern on the array 17 of rotor electrodes is static and strictly alternating, and is applied by connecting the voltage source 58 to the alternate electrodes 32, 36 and 40, and by connecting the voltage source 60 to the electrodes 34, 38 and 42, adjacent the electrodes 32, 36 and 40, respectively.

A substantially alternating pattern of voltages is applied to the stator electrodes through the electrode control 30 and voltage source 31. As will be described in more detail below, the basically alternating voltage pattern may be created by applying a voltage level 1 to the alternate electrodes 16, 20, 24 and 28 and a voltage level 0 to the electrodes 18, 22 and 26, adjacent the electrodes 16, 20 and 24, respectively.

To reduce the out-of-plane attractive force exerted between the stator and the rotor for a given in-plane force, the pitch of the rotor electrodes is chosen in relation to the spacing between the opposed surfaces 13 and 15 so that the ratio between pitch $p_r$ of the electrodes on the rotor and the spacing d between is less than eight, i.e., the pitch/spacing ratio, $p_r/d$, is less than eight.

The ratio of the pitch $p_s$ of the stator electrodes to the pitch $p_r$ of the rotor electrodes is the inverse of the ratio of the number $n_s$ of stator electrodes in the stator electrode array to the number $n_r$ of rotor electrodes in the rotor electrode array. In the example shown in FIG. 1, ratio of the pitch $p_s$ of the stator electrodes to the pitch $p_r$ of the rotor electrodes is 6:7.

To multiply the in-plane force exerted on the rotor 14 by a factor of m, m arrays of rotor electrodes similar to the rotor electrode array 17 are concatenated across the opposed surface 15 of the rotor, and m arrays of stator electrodes similar to the stator electrode array 11 are concatenated across the opposed surface 13 of the stator 12. Thus, multiple arrays of six and seven electrodes are concatenated along the opposed surfaces of the rotor and stator, respectively. Adjacent arrays are spaced from one another by a spacing equal to the pitch of the electrodes in the arrays themselves to maintain a constant pitch along the length of the concatenated arrays.

Figure 2:
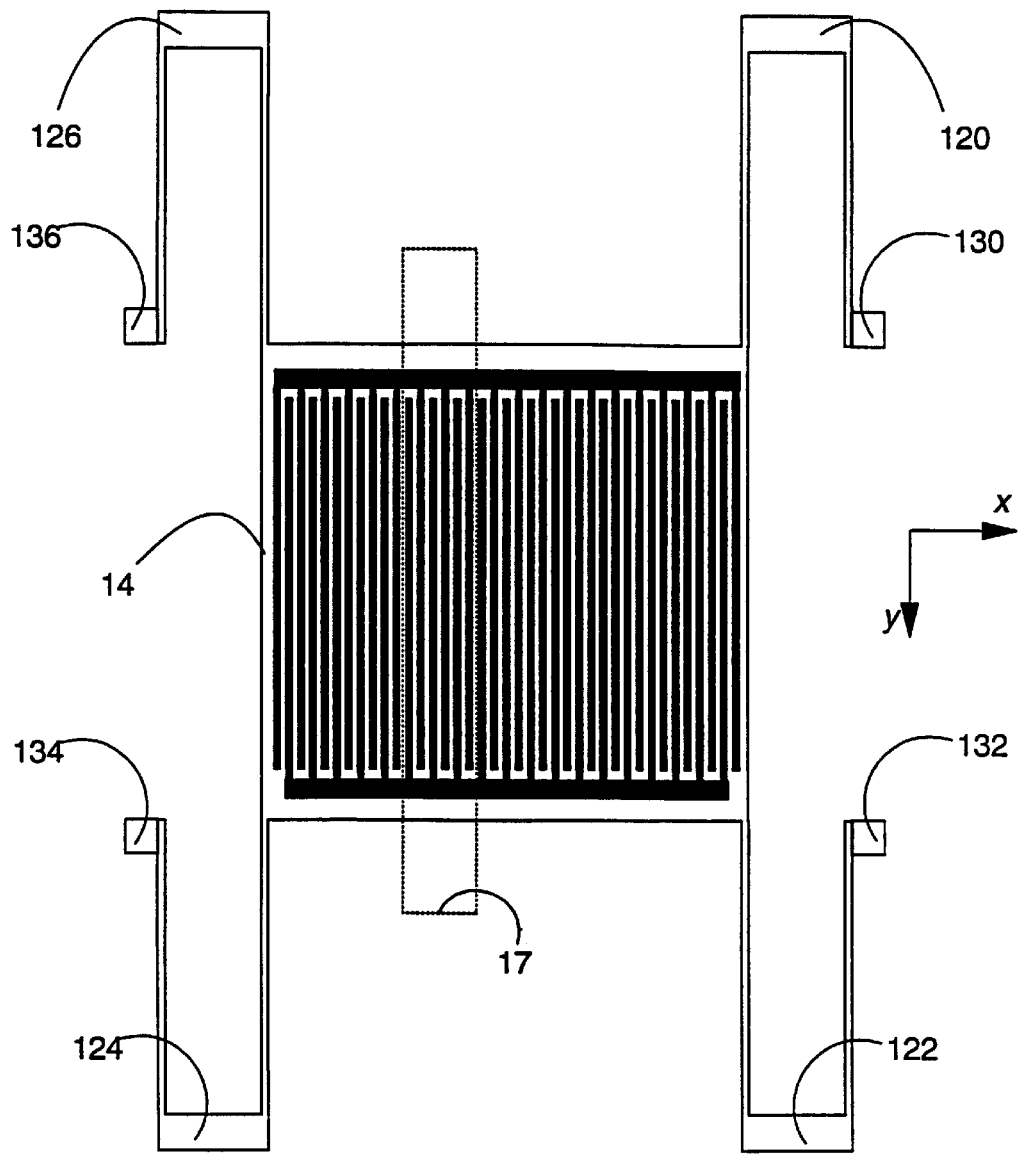
FIG. 2 is a bottom view of an embodiment of the rotor shown in FIG. 1.

The opposed surface 15 of the rotor 14, on which multiple electrodes arrays, all similar to the electrode array 17, and including the electrode array 17, are concatenated, is shown in FIG. 2. Alternate electrodes are electrically interconnected so that two sets of electrodes are formed. The first set is composed of the electrodes 32, 36 and 40, and the second set composed of the electrodes 34, 38 and 42. Connecting one of the electrode sets to the voltage source 58, and connecting the other of the electrode sets to the voltage source 60, which generates a different voltage from the voltage source 58, establishes an alternating voltage pattern of along the opposed surface 15.

The folded beam flexures 120, 122, 124 and 126 connect the rotor 14 to anchors 130, 132, 134 and 136. The anchors are in turn connected to the stator (not shown in FIG. 2). The folded beam flexures are flexible in the x-direction but are stiff in the z-direction, perpendicular to the plane of the drawing. The flexibility of the folded beam flexures in the x-direction allows the rotor to move freely in the x-direction. The stiffness of the folded beam flexures in the z-direction maintains the spacing in the z-direction between the rotor and stator notwithstanding the out of plane force exerted on the rotor.

The alternating voltage pattern on the rotor and stator is simple to establish yet enables the ratio between the out-of-plane force and the in-plane force to be as small as unity. This ratio is sufficiently low to enable the folded beam flexures 120, 122, 124 and 126 that support the relative to the stator to have an aspect ratio, i.e., a ratio of width to thickness, that lies within the range that can easily be fabricated using conventional semiconductor processing techniques. For example, in an early experimental prototype, a 1 mm-square rotor on which was formed an array of four electrodes was suspended above a stator on which was formed six electrodes. The rotor was suspended using folded beam flexures having a 7:1 aspect ratio., An actuation voltage of 4V generated an in-plane actuation force of 3 μN, which was sufficient to move the rotor a distance of 8 μm. The actuation voltage was sufficiently low to enable it to be controlled using conventional MOS circuits.

Figure 3:
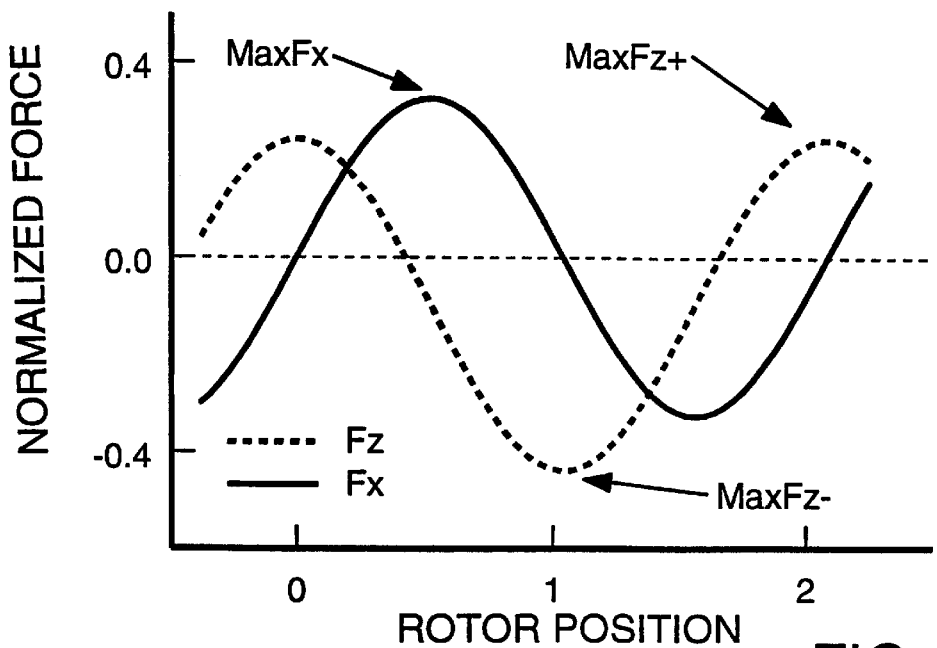

The electrostatic forces exerted on the rotor by the stator can be more completely analyzed using either finite element modeling programs or methods of electrostatic analysis such as those described by Jackson in Classical Electrodynamics, John Wiley and Sons, New York, 1975. FIG. 3 shows the in-plane force $F_x$ and the out-of-plane force $F_z$ plotted as functions of the in-plane position of the rotor relative to the stator, i.e., the position of the rotor in the x-direction. The position of the rotor in the x-direction is normalized to the pitch $p_r$ of the rotor electrodes. The in-plane force and the out-of-plane force are normalized to the force of attraction between the plates of a similarly-sized parallel-plate capacitor. In this example, the ratio of the pitch of the rotor electrodes to the spacing, i.e., $p_r/d$, is 2.25. The rotor position 1.5 in FIG. 3 corresponds to the rotor position shown in FIG. 1.

The in-plane force $F_x$ exerted on the rotor 14 is a sinusoidal function of the position of the rotor in the x-direction, and is centered about the origin, i.e., the maximum in-plane force in the +x-direction is equal to the maximum in-plane force in the −x-direction. The out-of-plane force $F_z$ exerted on the rotor is also a sinusoidal function of the in-plane position of the rotor. However, the out-of-plane force is offset relative to the origin so that the maximum out-of-plane force in the −z-direction, $MaxF_z-$, is greater than the maximum out-of-plane force in the +z-direction, $MaxF_z+$. A negative value of $F_z$ indicates that the out-of-plane force is exerted in the −z-direction, and attracts the rotor towards the stator, while a positive value indicates that the out-of-plane force is exerted in the +z-direction, and repels the rotor away from the stator.

It can be seen that, in the example shown in FIG. 3, the maximum in-plane force $MaxF_x$ has a similar magnitude to the maximum out-of-plane attractive force $MaxF_z-$. The near-unity ratio between the maximum out-of-plane attractive force and the maximum in-plane force substantially reduces the constraints on the suspension between the rotor and the stator, and allows the use of beam flexures with aspect ratios that can be easily manufactured using conventional semiconductor fabrication techniques. The maximum in-plane force that a 1.0 mm-square rotor having electrodes with an alternating voltage pattern can apply against a load is 0.25 $\mu NV^{-2}$ for a spacing d=2.5 $\mu$m. This is much larger than the maximum in-plane force that can be exerted by similarly-sized conventional electrostatic actuators. The voltage-to-in-plane force conversion efficiency of the electrostatic actuator according to the invention allows the actuator to be operated with drive voltages that are considerably smaller than that required by conventional actuators. Useable actuation forces can be generated using actuation voltages low enough to be controlled using conventional MOS circuits.

The rotor has a stable position where the in-plane force crosses zero with a negative slope. Though the electrostatic actuator according to the invention has a significantly reduced out-of-plane to in-plane force ratio compared with conventional electrostatic actuators, the rotor is still subject to an out-of-plane attractive force at its stable position. Embodiments which further reduce the out-of-plane attractive force will be described below.

FIG. 3 indicates that there is a second rotor position where the in-plane force is zero. At this position, the rotor equilibrium is unstable, and the out-of-plane force is a maximum in the positive direction, i.e., the rotor is repelled from the stator. If the rotor is located at this position and is prevented from moving in the x-direction, the out-of-plane force will act as a stable levitation force on the rotor.

As noted above, an alternating pattern of voltages does not by itself yield a maximum in-plane force comparable with the maximum attractive out-of-plane force. The pitch/spacing ratio $p_r/d$, i.e., the ratio between the rotor electrode pitch $p_r$ and the spacing d between the opposed surfaces 13 and 15 of the stator and rotor, respectively, must also be within an optimum range. The sinusoidal force curves shown in FIG. 3 can be adequately characterized by the three extrema $MaxF_x$, $MaxF_z+$ and $MaxF_z-$. $MaxF_x$ is the maximum in-plane force, $MaxF_z+$ is the maximum repulsive out-of-plane force, and $MaxF_z-$ is the maximum attractive out-of-plane force.

Figure 4:
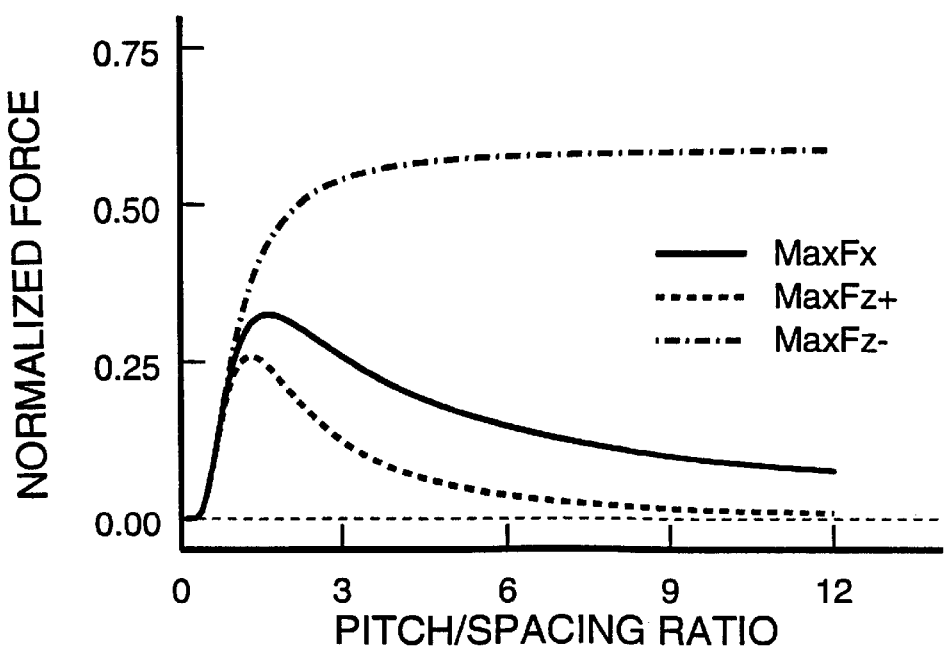
FIG. 4 is a plot of the three extrema from the force curves of FIG. 3 as functions of the pitch/spacing ratio of the rotor electrodes.

FIG. 4 shows how the three extrema vary as functions of the pitch/spacing ratio p/d. The in-plane force, $MaxF_x$, and the repulsive out-of-plane force, $MaxF_z+$, have maxima when the pitch/spacing ratio is about 1.5. The out-of-plane attractive force $MaxF_z-$ increases as the pitch/spacing ratio increases and reaches a substantially constant value at large values of the pitch/spacing ratio.

The ratio of the maximum out-of-plane attractive force $MaxF_z-$ to the maximum in-plane force $MaxF_x$ is especially important for micromachined surface actuators because of practical limitations on making the rotor suspension with a very high aspect ratio. If the out-of-plane to in-plane force ratio is small, then much greater lateral travel can be achieved using folded beam flexures to support the rotor.

Figure 5:
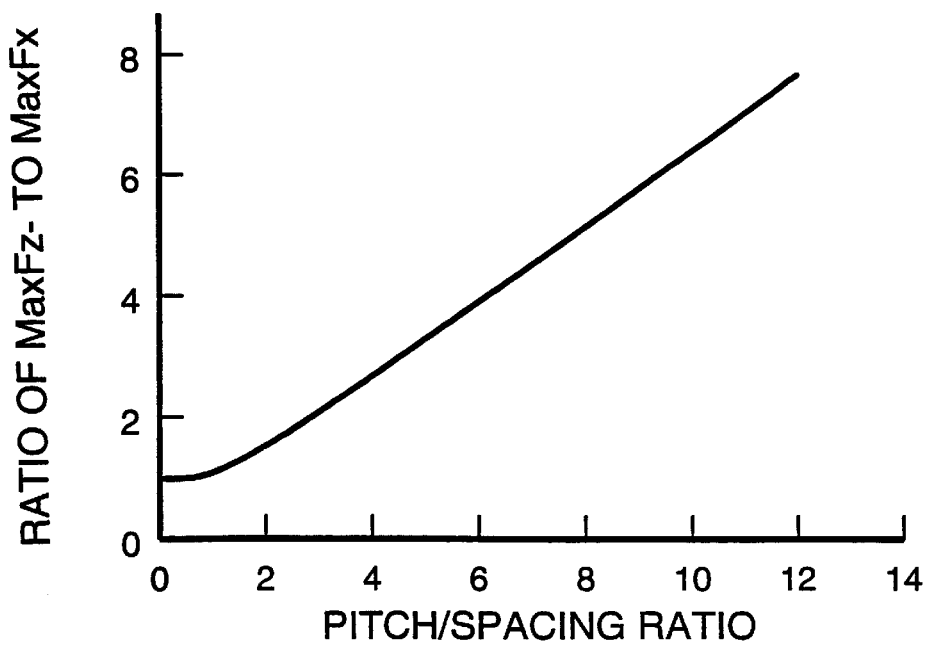
FIG. 5 is a plot of the ratio of out-of-plane attractive force to in-plane force as a function of the pitch/spacing ratio of the rotor electrodes.

FIG. 5 shows the force ratio, i.e., the ratio between the maximum attractive out-of-plane force and the maximum in-plane force, plotted as a function of the pitch/spacing ratio p/d. Satisfactory operation with folded beam flexures having an aspect ratio that can be conveniently manufactured occurs for force-ratios-as large-as -five; corresponding-to-a pitch/spacing ratio as large as eight. With a force ratio as large as five, the maximum out-of-plane force that the suspension must counteract requires the suspension to have a large out-of-plane stiffness. The resultant in-plane stiffness of the suspension limits the in-plane travel of the rotor. An optimal compromise between the magnitude of the in-plane force and ratio between $MaxF_z-$ and $MaxF_x$ occurs when the pitch/spacing ratio is less than 2.25, i.e., p/d<2.25. When this pitch/spacing ratio is in this range, a large in-plane force is generated, as shown in FIG. 4, and the out-of-plane to in-plane force ratio is close to unity.

2. Stepping Actuation

The electrostatic actuator shown in FIG. 1 is capable not only of generating a sizable static lateral force, but also of operating as a stepping motor. In contrast to the static operation of the electrostatic actuator, the stable position of the rotor changes in the in-plane direction relative to that of the stator when the electrostatic actuator operates as a stepper motor. The stable in-plane position of the rotor is changed by creating a local disruption in the basically alternating voltage pattern applied to the array of electrodes on either the rotor or the stator. The alternating voltage pattern applied to the other array of electrodes remains unchanged.

The array of electrodes whose alternating voltage pattern is disrupted will be called the drive array, and the electrodes in the drive array will be called drive electrodes. The array of electrodes whose alternating voltage pattern remains unchanged will be called the driven array, and the electrodes in the driven array will be called driven electrodes. Since it is usually easier to make multiple electrical connections to the stator electrodes than to the rotor electrodes, the drive electrodes are located on the stator and the driven electrodes are located on the rotor in the preferred embodiment. However, the locations may be reversed. The electrode arrays that move the rotor in the in-plane direction will be called stepper arrays to distinguish them from other electrode arrays that serve other purposes. Motion of the rotor in the in-plane direction will be called stepping motion. In some applications, the electrostatic actuator may be configured so that changing the alternating voltage pattern applied to the driver electrode array would result in movement of the rotor if the rotor were free to move. In this disclosure, a change in the alternating voltage pattern that would result in movement if the rotor were free to move will be said to "move" the rotor even though no movement actually occurs.

Operation of the stepper arrays 11 and 17 described above with reference to FIG. 1 to provide stepping motion will be described next with reference to FIG. 6. FIG. 6 schematically shows an example of the alternating voltage patterns applied to the driven electrode array 17 and the drive array electrode 11. In this example, there are six electrodes in the driven array 17 and seven electrodes in the drive array 11. The low and high voltage states are indicated by the letters "L" and "H," respectively. Since the voltage states applied to the drive electrodes change, the voltage states of the drive electrodes in four consecutive steps of stepping the rotor position are shown in the steps marked a through d in the figure.

The driven array 17 has a fixed alternating voltage pattern of low and high voltage states. The initial pattern of voltage states on the drive array 11 is shown in step a in FIG. 6. In this, alternate electrodes have the same voltage state and adjacent electrodes have opposite voltage states, so the initial voltage pattern is the above-described alternating voltage pattern. In-plane movement of the rotor is obtained by a applying a sequentially-moving local disruption to the alternating voltage pattern on the drive array. The sequentially-moving local disruption is applied by changing the voltage state of one of the drive electrodes. The position of the electrode whose voltage state is changed is sequentially shifted along the drive electrode array. In the example shown, the local disruption shifts from left to right. However, the local disruption may shift from right to left.

The alternating voltage pattern on the drive array 11 is locally disrupted by switching the drive electrode 16 from the low voltage state to the high voltage state, leaving the voltage states of the remaining six drive electrodes 18–28 unchanged. The resulting pattern of voltage states is shown in step b of FIG. 6. The voltage pattern on the drive electrodes remains substantially alternating despite the local disruption caused by the two adjacent electrodes 16 and 18 being in the same voltage state. Locally disrupting the alternating voltage pattern on the drive array by switching the voltage state of the electrode 16 generates an in-plane force that drives the rotor one step to the left in the in-plane direction.

To move the rotor another step to the left in the in-plane direction, the local disruption in the alternating voltage pattern on the drive array is shifted by one electrode to the right by switching the drive electrode 18 from the high voltage state to the low voltage state. The electrode 18 is the electrode adjacent the electrode 16 whose voltage state was previously switched. The voltage states of the remaining six drive electrodes remain unchanged. The resulting voltage pattern is shown in step c of FIG. 6.

To move the rotor one more step to the left in the in-plane direction, the local disruption in the alternating voltage pattern on the drive array is shifted by one further electrode to the right by switching the drive electrode 20 from the low voltage state to the high voltage state. The electrode 20 is the electrode adjacent the electrode 18 whose voltage state was previously switched. The voltage states of the remaining six drive electrodes remain unchanged, so the voltage pattern on the drive electrodes on each side of the local disruption remains an alternating voltage pattern. The resulting voltage pattern is shown in step d of FIG. 6.

FIG. 6 shows the location of the local disruption in the alternating voltage pattern applied to the drive array shifting by one electrode to the right in each step. A further three steps (not shown), in which the voltage states of the drive electrodes 22, 24 and 26 are switched, move the local disruption to the right-hand extreme of the drive array 11. One further step (not shown) switches the voltage state of the drive electrode 28 from low to high to form an undisrupted alternating voltage pattern that differs from the undisrupted voltage pattern shown in step a only in that the high and low voltage states are interchanged. One more step switches the voltage state of the drive electrode 16 from high to low to return the local disruption to the left-hand extreme of the drive array.

The movement of the local disruption is shown more clearly when two or more arrays of stepper electrodes are concatenated. FIG. 7 shows the second driven array 63 concatenated with the first driven array 17, and the second drive array 65 concatenated with the first drive array 11. The concatenated arrays are spaced from one another by a distance equal to the pitch of the electrodes in each array so that the pitch of the driven electrodes in the drive arrays 17 and 63 and the pitch of the drive electrodes in the drive arrays 11 and 65 are continuous across the respective opposed surfaces 13 and 15.

In the example just described, the local disruption introduces a local phase inversion into the alternating voltage pattern applied to the stator electrode array. Alternatively, the local disruption may introduce a local phase shift smaller than a phase inversion into the alternating voltage pattern.

A continuous alternating voltage pattern is applied to the concatenated driven arrays 17 and 63 as shown in FIG. 7. This is done by applying the same voltage states to corresponding electrodes of adjacent driven arrays. Thus, in the example shown, the voltage state of the left-hand electrode 32 of the driven array 17 and that of the left-hand electrode of the driven array 63 are both low.

In contrast, the alternating voltage patterns applied to the arrays of drive electrodes are local to the arrays themselves. The voltage states of corresponding electrodes of adjacent drive arrays is the same, so that a local disruption, namely, a local phase inversion in the example shown, exists at the boundary between adjacent drive electrode arrays. This can be seen in step a of FIG. 7. The right-hand electrode 28 of the drive array 11 and the adjacent left-hand electrode of the drive array 65 are both in the Low voltage state. Consequently, when drive electrode arrays are concatenated, the substantially alternating voltage pattern applied to the drive electrode arrays includes a local disruption initially located at the interface between each pair of adjacent drive arrays.

Steps b–d show how two local disruptions in the alternating voltage pattern are progressively shifted to the right in one-electrode steps from their respective initial locations at the left-hand end of the drive array 11 and at the interface of the drive arrays 11 and 65. In both cases, the local disruption is shifted by changing the voltage state of one corresponding electrode in each of the drive arrays 11 and 65 in each step. The person of ordinary skill in the art will appreciate that the voltage pattern examples shown in steps a to d can be extended to show how a local disruption that originates at the left-hand end of the drive array 11 can travel across the concatenated drive arrays until it reaches the right-hand end of the drive array 63.

The electrode control 30 can alternatively cause the local disruptions in the alternating voltage pattern to move from right to left to move the rotor from left to right.

Using concatenated electrode arrays does not increase the complexity of the voltage control 30 that controls the voltages applied to the drive electrodes. This is because corresponding electrodes of each drive array are always in the same voltage state, and can therefore be electrically connected in parallel. The parallel-connected electrodes are then connected to one output of the electrode control 30. Irrespective of the total number of drive electrodes, the number of outputs on the electrode control is equal to the number of electrodes in each drive array. Thus, in the example shown in FIG. 7, in which there are seven electrodes in each drive array, the electrode control has seven outputs.

Figure 8:
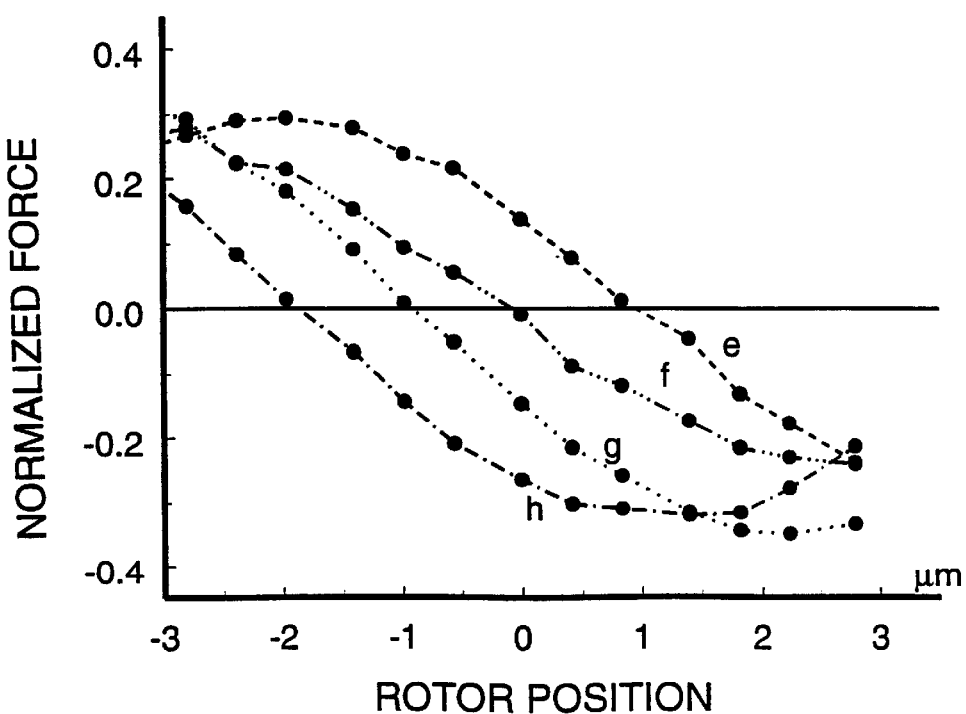
FIG. 8 is a plot of the in-plane forces as functions of the rotor position for four voltage states in one embodiment of the invention.

FIG. 8 shows how the in-plane force exerted on the rotor varies as a function of the rotor position when four different voltage patterns labeled e,f, g and h are applied to the drive electrodes. These voltage patterns were e-LLH LLH,f-HLH LLH, g-HLH HLH, and h-HLL HLH. The results shown in FIG. 8 were calculated using a mathematical model of an electrostatic actuator in which each drive array had six electrodes and each driven array had four electrodes. However, similar variations of in-plane force with rotor position are obtained with an electrostatic actuator in which each drive array has seven electrodes and each driven array has six electrodes, as described above. In this example, the rotor pitch was 6 $\mu$m. The in-plane force is calculated for only a small range of rotor positions, so only a portion of the sinusoidal force curve is visible. The calculated values do not all lie on smooth curves because of limitations of the finite element modeling package used to generate the curves.

The rotor has four stable positions where the in-plane force is zero. When the alternating voltage pattern e is applied to the drive electrodes, the stable position occurs at a rotor position of about +1 $\mu$m in FIG. 8. When the alternating voltage pattern is switched to voltage pattern f, the stator exerts a force on the rotor in the −x direction, which steps the rotor towards the stable position of the voltage pattern f, i.e., to a rotor position of about 0 $\mu$m. Progressively switching the alternating voltage pattern applied to the drive electrodes to alternating voltage patterns g and h causes the stable position of the rotor to move in uniform steps. Switching from one voltage pattern to the next effectively shifts the locations of the in-plane and out-of-plane force curves in successive steps. The step size is determined by the pitch of the driven electrode array divided by the number of electrodes in each drive array. For example, in the embodiment described above in which there are seven electrodes in each drive array on the stator, the step size is one seventh of the rotor pitch.

There are several important benefits of stepping the rotor in the manner just described. First, the drive electrodes operate with voltage signals having only two voltage states, e.g., 0V and 5V, that can easily be controlled by a digital circuit.

Second, the alternating voltage pattern applied to the driven electrodes remains unchanged when the rotor position is stepped. When the driven electrodes are located on the rotor, as they preferably are, this enables the stepping speed to be independent of the electrical characteristics of the rotor. The rotor electrodes can have a high capacitance, and the conductors connecting the rotor electrodes to the voltage sources 58 and 60 can have a high resistance. However, since the alternating voltage pattern on the rotor electrodes is static, the long time constant resulting from high capacitance electrodes fed via high-resistance conductors does not adversely affect the dynamic performance the actuator. The alternating voltage pattern applied to the rotor electrodes remaining static during dynamic operation of the electrostatic actuator reduces the fabrication complexity of the rotor.

Finally, the voltage state of only one drive electrode in each drive electrode array is switched at a time to step the rotor. This reduces jitter and the timing constraints on the electrode control 30.

3. Out-of-Plane Levitation

In the electrostatic actuator described above, the stator exerts an out-of-plane attractive force on the rotor when the rotor is at its stable in-plane positions, even though the out-of-plane force is reduced compared with conventional electrostatic actuators. For an electrostatic actuator in which the rotor is required to step in only one in-plane direction, for example, in the ±x-direction, an additional array of electrodes can be provided on the opposed surfaces 13 and 15 of the stator 11 and the rotor 14, respectively, to generate an out-of-plane levitation force that counteracts the out-of-plane attractive force. The electrodes in the additional arrays of electrodes are oriented perpendicular to the electrodes in the stepper arrays that step the position of the rotor.

To distinguish the arrays of electrodes that generate the out-of-plane levitation force from the stepper arrays that generate the in-plane force to step the rotor, the former will be called levitator arrays, and the electrodes in them will be called levitator electrodes. The same drive and driven convention applied to the stepper arrays will also be applied to the levitator arrays.

The levitator arrays differ from the stepper arrays in that the voltage levels applied to the driven levitator electrodes are different from the voltage levels applied to the drive levitator electrodes. Moreover, for the levitator arrays to be effective, the rotor must be constrained against in-plane movement in the direction perpendicular to the lengthwise direction of the levitator electrodes. The structure and operation of the levitator electrodes will be described below.

Figure 9:
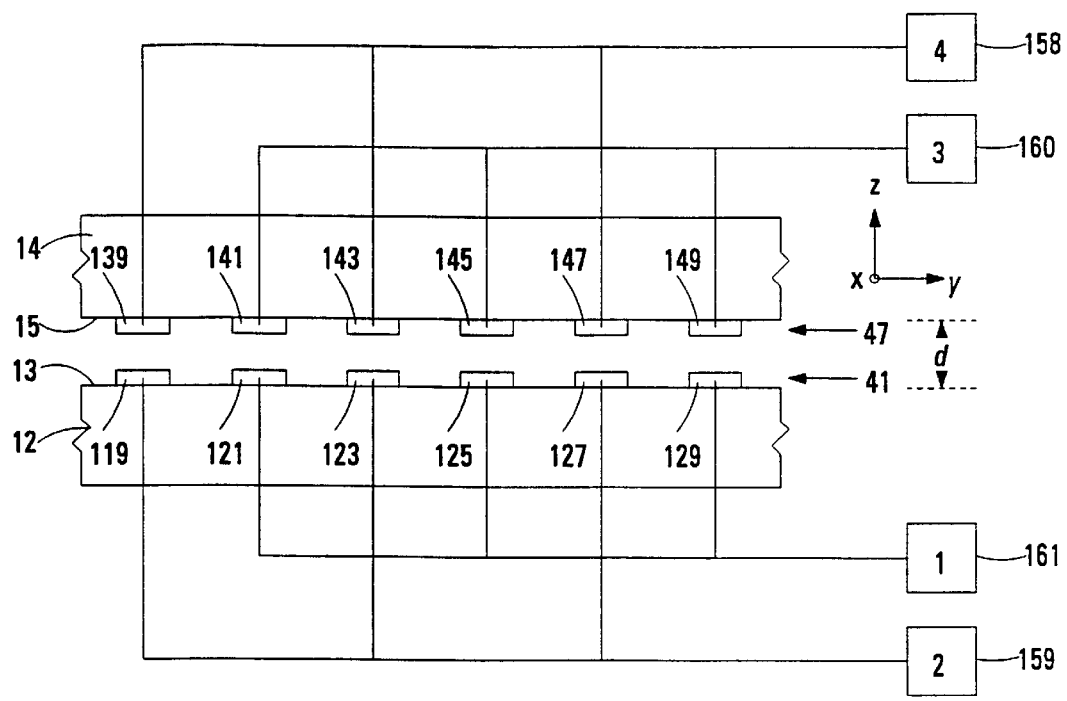
FIG. 9 is a schematic side view of an embodiment of the invention in which a levitator electrode arrays apply an out-of-plane levitation force to the rotor.

FIG. 9 shows the electrostatic actuator 100 that includes the stator 12 and the rotor 14. The stator includes a plane opposed surface 13 along which a linear array 41 of stator levitator electrodes 119, 121, 123, 125, 127 and 129 is disposed. The rotor includes a plane opposed surface 15 along which a linear array 47 of rotor levitator electrodes 139, 141, 143, 145, 147 and 149 is disposed. The stator levitator electrodes and the rotor levitator electrodes are each elongate in the x-direction, perpendicular to the plane of the drawing. The pitch of the stator levitator electrodes is substantially equal to the pitch of the rotor levitator electrodes. There are no constraints on the number of electrodes in each array. The stator levitator array is preferably the drive levitator array, and the rotor levitator array is preferably the driven levitator array.

The rotor 14 is supported relative to the stator 12 so that the opposed surface 13 of the stator is spaced apart from the opposed surface 15 of the rotor by the spacing d. Similar to the stepper electrodes, the pitch/spacing ratio of drive and driven levitator electrodes should be less than eight, and best operation is obtained with a pitch/spacing ratio less than 2.25.

The voltage source 158 is connected to alternate drive electrodes 139, 143, and 147, and the voltage source 160 is connected to alternate drive electrodes 141, 145 and 149 to apply an alternating voltage pattern to the driven levitator electrode array 47. The voltage source 159 is connected to alternate driven electrodes 119, 123, and 127 and the voltage source 161 is connected to alternate driven electrodes 121, 125 and 129 to apply an alternating voltage pattern to the drive levitator electrode array 41. At least one of the voltage levels provided by the voltage sources 158 and 160 is different from the voltage levels at provided by the voltage sources 159 and 161. The voltage levels of the voltage sources 160 and 161 are set to be smaller than voltage levels of the voltage sources 158 and 159, respectively.

The rotor 14 is constrained so that it cannot move in they-direction, perpendicular to the x-direction in which the stepper electrodes step the rotor. The rotor may also be constrained in the direction of the z-axis, or may be free to move in that direction. Finally, the rotor may be constrained in the direction of the x-axis, or may be free to move in that direction.

In the example shown in FIG. 9, the rotor 14 is positioned in the y-direction so that the rotor levitator electrodes to which the lower voltage level is applied are substantially opposite the stator levitator electrodes to which the lower voltage level is applied. This relative positioning of the electrodes corresponds to the rotor position 0 in FIG. 3. In this position, the out-of-plane repulsive force is a maximum, and the rotor will be repelled from the stator 12 with maximum voltage-to-force conversion efficiency. FIG. 3 also shows that the in-plane force is zero when the rotor is in this position. However, the in-plane equilibrium at this position is unstable, which is why the rotor has to be constrained in the y-direction.

The magnitude of the out-of-plane levitation force exerted between the levitator arrays 41 and 47 can be varied by changing any of the voltage levels provided by the voltage sources 158, 159, 160 and 161. However, it is preferable that the voltages applied to the rotor levitator electrodes remain constant. This enables the number of electrical connections to the rotor to be minimized, since it allows the same voltages to be applied to both the levitator electrodes and the stepper electrodes on the rotor. In this case, the levitation force on the rotor is adjusted by changing the voltage of the voltage source 159 connected to the stator levitator electrodes. Increasing this voltage increases the levitation force.

The levitation force exerted on the rotor 14 by the levitator arrays 41 and 47 can be used to move the rotor in the z-direction. Additionally or alternatively, the levitator arrays can be used in electrostatic actuators in which stepper arrays step the rotor in a single in-plane direction, such as in the x-direction. For example, if the stepper arrays step the rotor in the x-direction, as described above, and the levitator electrodes are disposed lengthways in the x-direction, then the opposition of the alternating voltage patterns on the drive and driven levitator arrays does not change as the rotor moves in the x-direction.

Finally, the levitation force exerted on the rotor by the levitator arrays 41 and 47 can used to counteract the attractive out-of-plane force exerted on the rotor by the stepper arrays. The voltages applied to the drive levitator array can be controlled so that the net out-of-plane force on the rotor is reduced essentially to zero. This enables out-of-plane stiffness requirements of the rotor suspension to be substantially reduced.

4. A Practical Embodiment and Variations

The stepper arrays 11 and 17 and the levitator arrays 41 and 47 described above can be used together in an electrostatic actuator that provides precise stepping, large travel and a minimum out-of-plane force on the rotor suspension. Such an electrostatic actuator may be used, for example, to change the position of a memory surface in relation to an array of probes in a high-density memory device. A preferred embodiment of such an electrostatic actuator will be described next.

Figure 10:
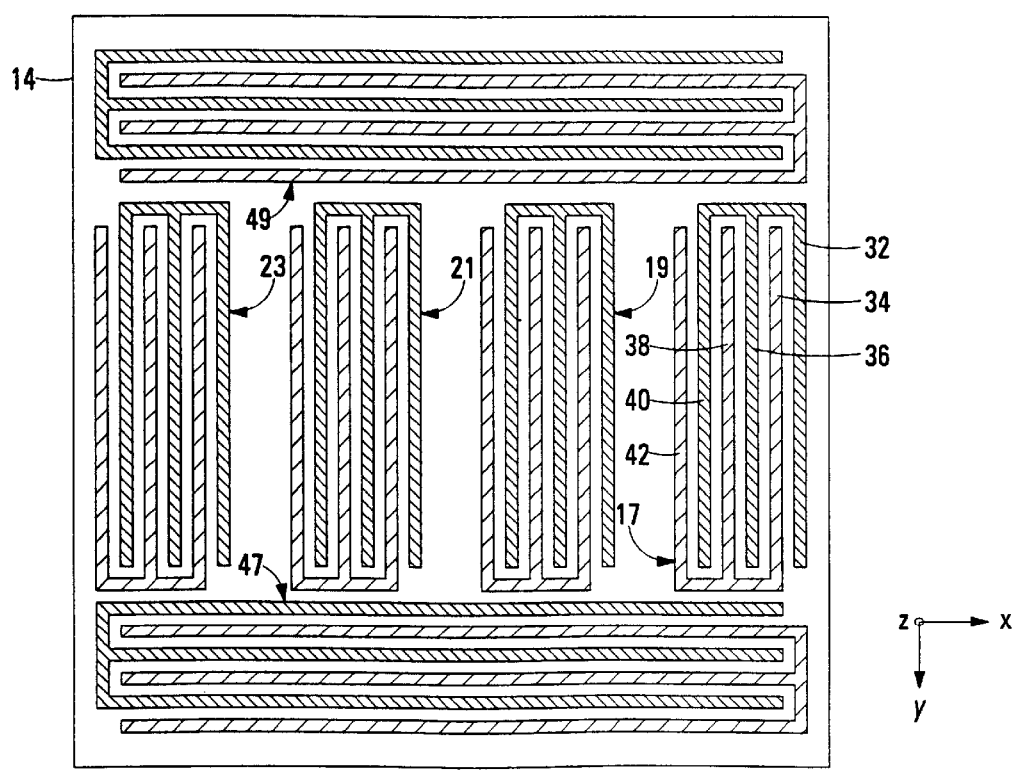
FIG. 10 shows the opposed surface of the rotor in an embodiment having multiple electrode arrays.

FIG. 10 shows a bottom view of the rotor 14 that has a number of arrays of electrodes on its opposed surface 15. Each array is an array of six electrodes. The stepper electrode array 17 is shown as including the stepper electrodes 32–42 of the embodiment shown in FIG. 1. With the rotor orientation shown in FIG. 10, the stepper electrode array 17 can step the rotor 14 parallel to the opposed surface 15 in the x-direction; i.e. perpendicular to the lengthwise direction of the electrodes 32–42, as described above. The electrode arrays 19, 21, and 23 are physically identical to the electrode array 17 but may have different functions, as will be described below.

All of the electrode arrays 17, 19, 21 and 23 may be used as driven stepper arrays to move the rotor 14 in the x-direction. In this case, the electrode arrays are separated from one another along the opposed surface 15 by a distance equal the rotor electrode pitch $p_r$, so that the electrode pitch of the concatenated electrode arrays 17–23 is continuous. In the preferred embodiment, each stepper electrode array is composed of six electrodes, as shown in FIG. 1. Alternative embodiments may have fewer or more electrodes in each array. Alternate electrodes are electrically interconnected, so that when the electrodes are connected to two different voltages, an alternating voltage pattern is established that extends across the concatenated electrode arrays in the x-direction.

Concatenated stepper electrode arrays similar to the array 11 are located on the opposed surface 13 of the stator 12 in an arrangement similar to that shown in FIG. 1. In the preferred embodiment, each array of stepper electrodes on the stator is composed of seven electrodes. Other embodiments may have fewer or more electrodes in each array. Each array of stepper electrodes on the stator is paired with an array of stepper electrodes on the rotor. In this preferred embodiment, the stepper electrode arrays on the rotor electrodes are the driven arrays, and the stepper electrode arrays on the stator are the drive arrays. The locations of the drive arrays and the driven arrays may be interchanged, but the drive arrays should have an odd number of stepper electrodes and the driven array should have an even number of stepper electrodes.

In addition to the four stepper electrode arrays 17, 19, 21 and 23 that step the rotor in the x-direction, two other electrode arrays 47 and 49 are located on the opposed surface 15. These arrays are disposed perpendicular to the electrode arrays 17–23. The array 47 is a levitator electrode array corresponding to the levitator electrode array 47 shown in FIG. 9, and is composed of the electrodes 139, 141, 143, 154, 147 and 149. Alternate electrodes in the levitator electrode arrays 47 and 49 are electrically interconnected, so that when the levitator electrodes are connected to two different voltages, an alternating voltage pattern is established on each levitator electrode array.

The levitator electrode arrays 47 and 49 may be operated in conjunction with corresponding levitator electrode arrays similar to the levitator electrode array 41 located on the stator, as shown in FIG. 9, (not shown) to apply a levitation force to the rotor. The levitator electrode arrays generate a repulsive out-of-plane force that may be used to counteract the attractive out-of-plane force generated by the stepper electrode arrays 17–23. The out-of-plane force generated by the levitator electrode arrays 47 and 49 may be controlled to maintain a predetermined spacing d between the opposed surfaces 15 and 13 of the rotor and stator, respectively, notwithstanding variations in the out-of-plane attractive force with the in-plane position of the rotor.

Alternatively, the voltages applied to the levitator electrode arrays 47 and 49 may be varied to change the spacing d. For example, in an advanced memory device, one of the voltage levels applied to the drive levitator electrodes may be switched to bring a memory medium located on the rotor into contact with an array of probes. The memory medium is located on a surface of the rotor 14 opposite the opposed surface 15.

The spacing d between the rotor and stator should be less than 30 $\mu$m. In the preferred embodiment, a value of d in the range of 1–6 $\mu$m produced optimum results.

The preferred embodiment of the electrostatic actuator is formed by micromachining using conventional integrated circuit fabrication techniques. For example, the rotor and stator may have a semiconductor substrate on which patterned dielectric and conductive layers are formed. In one embodiment, a single-crystal silicon substrate was used with its surfaces protected by a layer of silicon nitride. A layer of tungsten was deposited on top of the silicon dioxide layer and was selectively etched to form the electrodes and conductors interconnecting the electrodes. The use of integrated circuit fabrication techniques to form micromachined electrostatic actuators is known in the art. Alternatively, the substrates of the rotor and stator may be formed of materials conventionally used to form printed circuit boards or flex circuits.

The "low" voltage applied to the drive and driven electrodes may be at ground potential. The "high" voltage applied to the drive and driven electrodes is preferably less than 20 V, and satisfactory operation occurs with actuation voltages less than 10 V.

The rotor 14 can be supported over the stator 12 in a number of different ways. As discussed above, a mechanical support using bending flexures such as folded beam flexures is preferred because such a structure supports the rotor with no appreciable static or dynamic friction. An example of folded beam flexures is shown in FIG. 2. The low ratio of out-of-plane force to the in-plane force achieved in the electrostatic actuator according to the invention enables folded beam flexures with relatively small aspect ratio to be used. Such folded beams flexures can be made relatively easily using conventional semiconductor fabrication techniques.

The rotor may be suspended above the stator in other ways. The rotor may be suspended by a fluid layer such as an air layer or dielectric liquid layer, by rolling bearings or other rolling contact, by sliding contact, by sliding contact where one member is ultrasonically vibrated to reduce friction, and by van der Waals repulsion between surfaces between which is disposed an appropriate dielectric fluid.

In a first variation on the embodiment shown in FIG. 10, one or both of the electrode arrays 47 and 49 may be used as stepper arrays to step the rotor 14 in-plane in they-direction. In this case, the driven arrays 47 and 49 are aligned with corresponding stepper arrays located on the stator. The stepper electrode arrays are drive arrays similar to the stepper electrode array 11 shown in FIG. 1. With this arrangement of electrodes, disrupting the alternating voltage patterns on the drive arrays opposite the arrays 47 and 49 steps the rotor in the y-direction. The arrays 17–23, 47 and 49, when used as stepper arrays, enable the rotor to be stepped both the x-direction and they-direction.

In a second variation, the electrode arrays 19 and 21 are used as stepper electrodes together with the electrode arrays 17 and 23 to step the rotor 14 with a negligible out-of-plane force. The out-of-plane force is reduced to a negligible level by making the electrode pitch of the electrode arrays 17 and 23, and their corresponding stator electrode arrays, different from that of the electrode arrays 19 and 21.

When electrode arrays of different pitches are used to step the rotor 14, the forces exerted on the rotor will not be the simple sinusoidal curve shown in FIG. 2. Instead, the forces on the rotor are the sum of multiple force components having different spatial frequencies. The number of force components depends on the number of different electrode pitches. With the appropriate choice of the relative positions of the four electrode arrays 17–23, the rotor may have a stable position at which no net out-of-plane attractive force is exerted on it. This position is metastable in that there are other possible stable positions of the rotor where the rotor is subject to a significant out-of-plane attractive force. However, with appropriate initial conditions, the rotor may be maintained in the metastable position with no but-of-plane attractive force on it.

In a third variation, one or both of the electrode arrays 19 and 21 may be used as position sensors to detect the position of the rotor 14 in the x-direction. For example, the electrode array 21 may be used as a sensor array in conjunction with a corresponding sensor array on the stator 12 (not shown) by applying to one of the sensor arrays an alternating voltage pattern in which the voltages vary with time, and connecting monitoring circuitry to the other sensor array. The voltages of the alternating voltage pattern may be a.c. voltages. An alternating voltage pattern in which antiphase a.c. signals are applied to adjacent electrodes is particularly effective. Alternatively, the alternating voltage pattern may be varied digitally, and digital monitoring circuitry may be connected to the other sensor array. The position of the rotor 14 relative to the stator is tracked by the monitoring circuitry detecting variations in the induced charge or induced voltage.

Electrode arrays are best configured for use as sensor arrays when the arrays on both the rotor and the stator have the same pitch, and alternate electrodes of each array are electrically connected to one another. The array to which the voltage source is connected may be regarded as the sensor drive array, and the array to which the monitoring circuitry is connected may be regarded as the sensor driven array.

The monitoring circuitry used to monitor the variations in the induced charge or the induced voltage may be simplified by setting alternate sensor drive electrodes to equal and opposite voltages. If the sensor electrode pitch/spacing ratio is less than 2.25, this pattern of drive voltages generates a signal in the driven array that varies nearly sinusoidally in response to the position of the rotor. In conventional capacitive sensors, which have much larger pitch/spacing ratios, drive signals with a 90 degree phase difference are required to generate a sinusoidal position signal. Such drive signals require more complex circuitry to generate than the antiphase drive signals used in the position sensors according to the invention.

Figure 11:
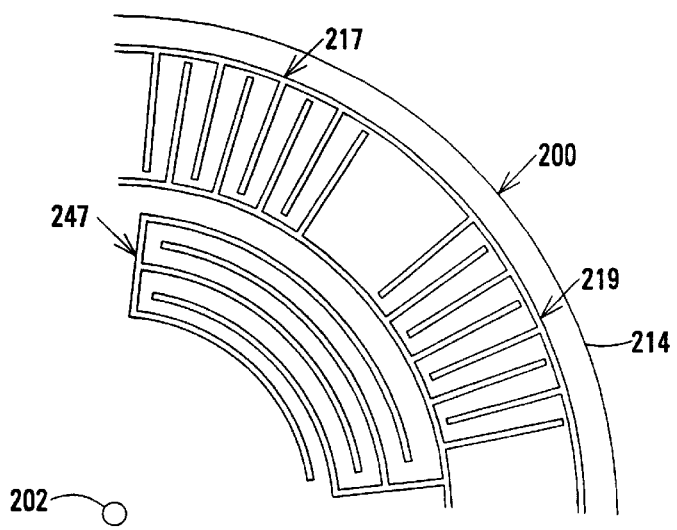
FIG. 11 shows the opposed surface of the rotor of an embodiment of the invention that operates as a rotary actuator.

The fourth variation is a rotary actuator 200, in which the rotor rotates and the stepper electrodes located on the rotor and the stator are disposed radially about the center of rotation 202. FIG. 11 shows a portion of the rotor 214 of such a rotary actuator. The stepper driven array 217 and the levitator driven array 247 are shown as examples of the electrode arrays that may be located on the opposed surface 215 of the rotor. Also shown is the additional array 219 that may be used to increase the applied in-plane force or to sense the rotor rotation. Each of these driven electrode arrays has a corresponding drive electrode array on the opposed surface of the stator (not shown).

As noted above, the stepper electrodes are disposed radially and about the center of rotation, while the levitator electrodes are disposed circumferentially. In the example shown, each stepper driven array, such as the electrode array 217, is composed of 10 electrodes. Accordingly, the corresponding stepper drive array on the stator (not shown) is preferably composed of 9 or 11 electrodes. Because the stepper electrodes are disposed radially, the electrode pitch depends on the radius at which the pitch is measured. The pitch/spacing ratio of the stepper array is determined using the electrode pitch measured half-way along the length of the electrodes.

Figure 12:
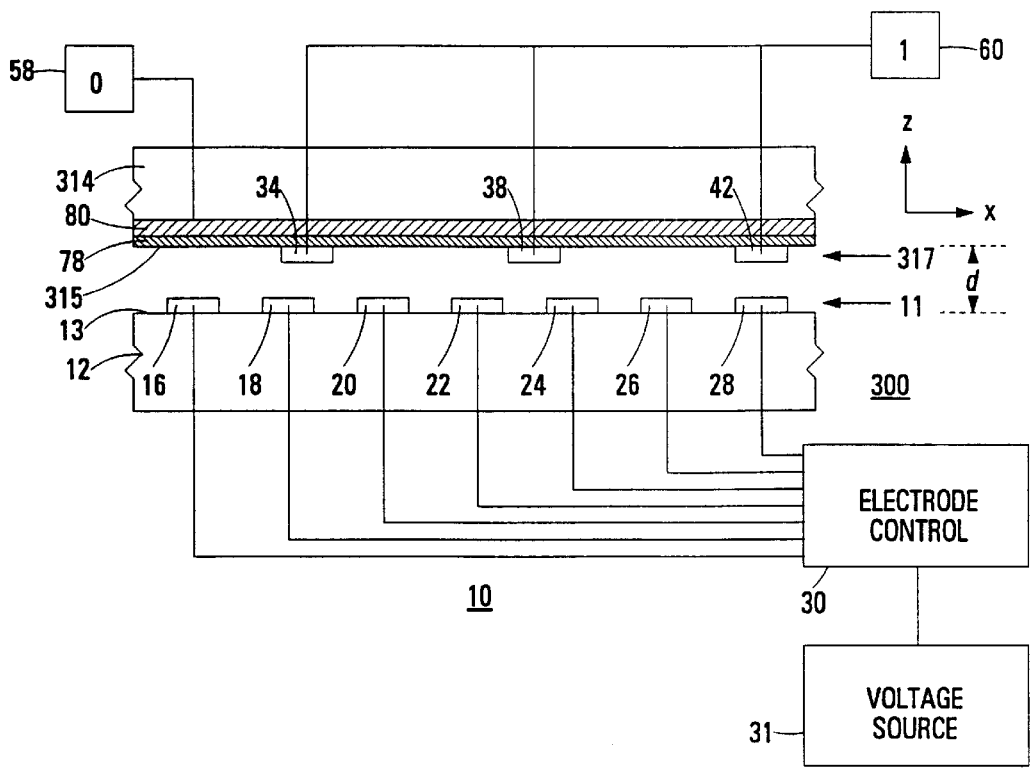
FIG. 12 is a schematic side view of an embodiment of the invention in which the driven electrode array is composed of alternate effective electrodes and physical electrodes.

In a fifth variation, shown in FIG. 12, the construction of the driven electrodes is changed. In the embodiments and variations described above, the electrodes in the driven array are each a distinct conductive element. Such electrodes will be called physical electrodes. In the rotor 314 of the embodiment 300 shown in FIG. 12, a conductive plane 78 is formed on the opposed surface 315 of the rotor. An insulating layer 80 is then deposited on the conductive plane, and the physical electrodes 34, 38, and 42 are located on the insulating layer. The number of physical electrodes 34, 38 and 42 located on the insulating layer is one-half of the number of electrodes in the array 317. The conductive plane is connected to the voltage source 58 and the physical electrodes 34, 38 and 42 are connected to the voltage source 60. The portions of the conductive plane 78 between the physical electrodes 34, 38, and 42 act as effective electrodes equivalent to the electrodes 32, 36 and 40 of the embodiment shown in FIG. 1, and operate together with the physical electrodes 34, 38, and 42 to establish an alternating voltage pattern along the opposed surface 315. Thus, the electrode array 317 constituted of the conductive plane 78 and the three physical electrodes 34, 38 and 42 has the same characteristics as the electrode array 17 constituted of the six physical electrodes 32–42 shown in FIG. 1. Thus, in the present disclosure, the term "electrode" is to be understood to encompass both physical electrodes and effective electrodes.

Figure 13:
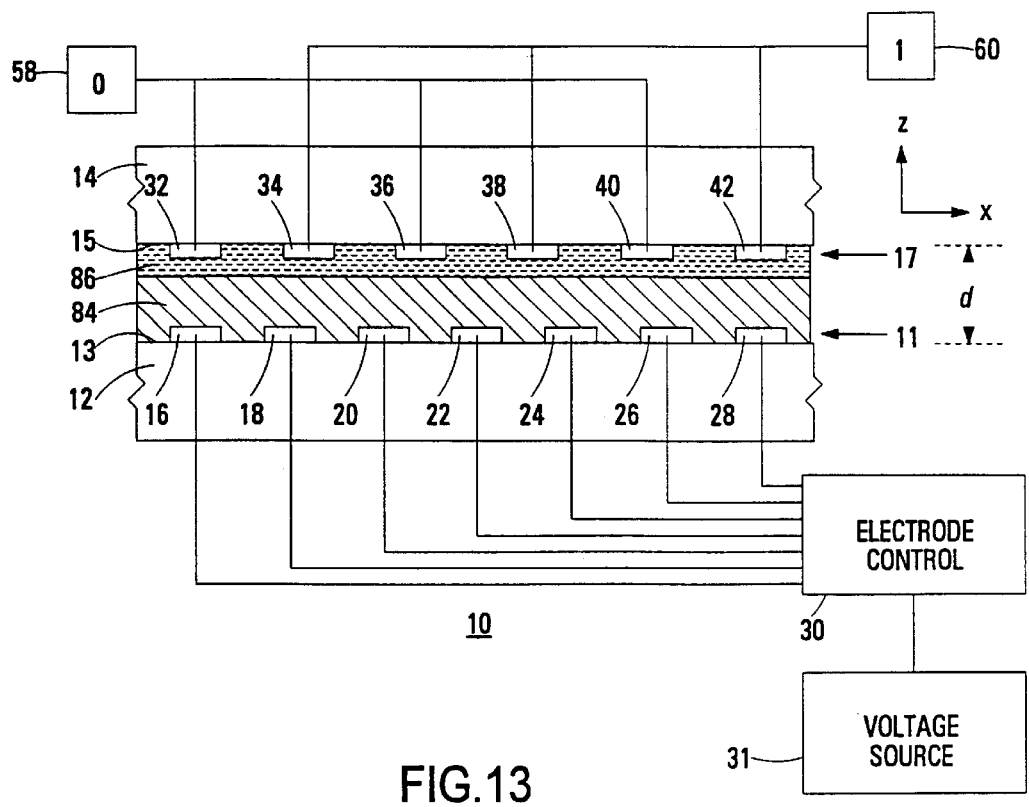
FIG. 13 is a schematic side view of an embodiment of the invention in which the space between the rotor and the stator is filled with liquid and solid dielectrics.

In a sixth variation, the space between the rotor and stator is filled with a solid dielectric layer 84 and a fluid dielectric layer 86, as shown in FIG. 13. Filling the space between the rotor and the stator with the dielectric layers reduces the attractive out-of-plane force exerted on the rotor. Suitable choices of the dielectric constants and the relative thicknesses of the two dielectric layers can reduce the out-of-plane force to a negligible level.

The material of the solid dielectric layer 84 preferably has a low dielectric constant, and its thickness is more than one-half of the spacing d between the opposed surface 13 of the stator 12 and the opposed surface 15 of the rotor 14. The solid dielectric layer is located adjacent the stator. An example of the material of the solid dielectric layer is polytetrafluorethylene (PTFE).

Alternatively, a layer of air may be used instead of the solid dielectric layer 84. If the air layer is located adjacent the stator, for example, a shallow cavity is formed in the stator and the stator electrodes are located on the floor of the cavity. The cavity is capped by a thin solid film that separates the air layer from the dielectric fluid 86.

The dielectric material of the fluid layer 86 has a dielectric constant greater than that of the dielectric layer 84. An suitable fluid is sold by 3M Company under the trademark Fluorinert.

Apart from the dielectric layer and the fluid layer, the structure and operation of the electrostatic actuator shown in FIG. 13 are the same as those of the embodiment shown in FIG. 1. In one embodiment, PTFE is used as the dielectric layer 84, Fluorinert is used as the fluid layer 86, the thickness of the dielectric layer is 0.9 times the spacing d between the opposed surfaces 13 and 15, the thickness of the fluid layer is 0.1d, and the rotor pitch to spacing ratio $p_r/d$ is unity. In this embodiment, the dielectric layer and the fluid layer collectively reduce the out-of-plane attractive force between the stator and the rotor substantially to zero. With larger values of the pitch/spacing ratio, the stator will exert an attractive out-of-plane force on the rotor, but with smaller values of the pitch/spacing ratio, the stator will exert a repulsive out-of-plane force on the rotor.

The value of the pitch/spacing ratio required to reduce the out-of-plane substantially to zero force depends on the ratio of the thickness of the dielectric layer to that of the fluid layer, and the difference between the dielectric constants of the dielectric material and the fluid. Increasing the ratio of the thickness of the dielectric layer to that of the fluid layer increases the pitch/spacing ratio at which the out-of-plane force becomes repulsive. Structures with larger pitch/spacing ratios are easier to fabricate.

The two dielectric layers reduce the out-of-plane attraction between the rotor 14 and the stator 12 regardless of the direction of travel of the rotor relative to the stator. If the movement is to occur along a plane that is parallel to the major surfaces of the substrates, the operation is identical to the operation described with reference to FIGS. 1, 6 and 7. Thus, there are an even number of "effective" rotor electrodes and an odd number of stator electrodes. If the appropriate voltage patterns are established along the rotor and stator electrodes, switching a single electrode will drive the rotor.

5. Stepping and Levitating Variations

While the invention has been described as having a fixed alternating voltage pattern on the rotor electrodes, this is not critical. In some circumstances, charges may accumulate on the driven electrodes that oppose the applied voltages. The severity of this problem can be reduced by occasionally inverting the voltage states of the driven electrodes.

Moreover, while the electrostatic actuator according to the invention has been described with DC voltage levels applied to the electrodes, this is not critical. All the basic operational functions of the actuator can be provided with a.c. voltages applied to the electrodes, provided that the a.c. voltages applied to the rotor electrodes are in phase with the a.c. voltages applied to the stator electrodes.

Referring briefly to FIG. 6, additional positional control of the in-plane movement of the rotor 14 may be achieved by setting the voltage states of the drive electrodes to more than two possible voltage levels. In the embodiment described above with reference to FIG. 1, the voltage state of one drive electrode at a time, for example, the electrode 16, is switched between the low voltage state to cause the rotor to move by one step. If, instead, the electrode control 30 sets the voltage of the electrode 16 to a voltage intermediate between the low voltage level and the high voltage level, this will still cause the rotor to move in the x-direction. However, the distance moved by the rotor is less than the step distance that results from the voltage state changing from the low voltage level to the high voltage level. Such an in-plane movement will be called a "microstep." Alternatively, rotor can be moved by a microstep by repetitively switching the voltage on the electrode, for example, the electrode 16, between the low voltage level and the high voltage level. The distance that the rotor will move is determined by the mark-space ratio of the switching waveform. The switching frequency should be larger than any of the mechanical frequencies associated with the rotor.

6. Definition of the Electrostatic Actuator in Terms of Spatial Wavelengths

The simplicity of the alternating voltage patterns on the rotor and the stator enables such alternating voltage patterns to be established using elements other than electrodes. Alternatives to electrodes for establishing an alternating voltage pattern on the opposed surface of the rotor or the stator include:

1. A generator that establishes a standing electromagnetic wave, similar to that in a cavity resonator, along the opposed surface.
2. Charged particles deposited on the opposed surface.
3. Piezoelectric material located on the opposed surface and a generator that subjects the piezoelectric material to an acoustic standing wave. The acoustic standing wave establishes a charge and voltage standing wave along the surface of the piezoelectric material.
4. A ferroelectric material that stores a pattern of charges located on the opposed surface.

Figure 14:
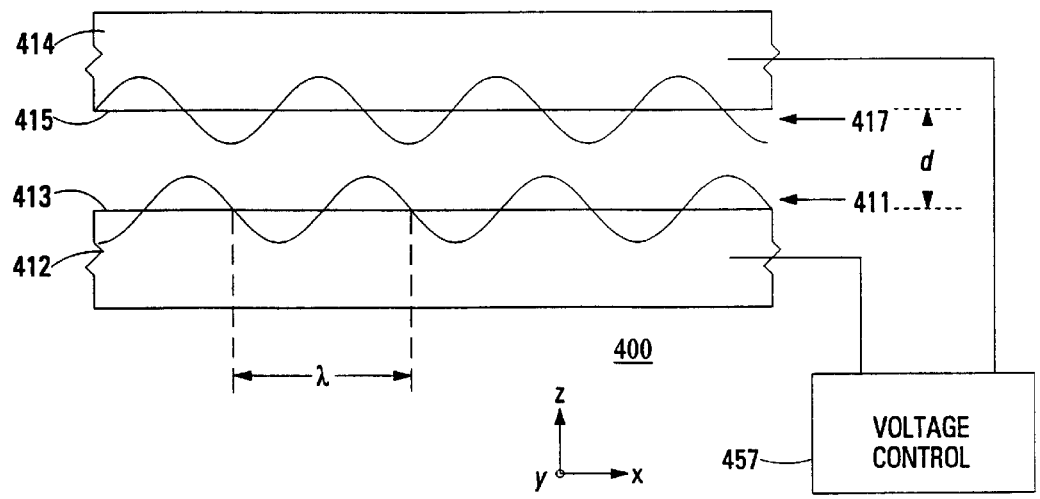
FIG. 14 is a schematic side view of an embodiment of the invention in which arbitrary voltage patterns present on the surfaces of the rotor and stator.

Embodiments of the electrostatic actuator in which the alternating voltage pattern is established using electrodes or by any of the above alternatives can be described mathematically as shown in FIG. 14. The electrostatic actuator 400 shown in FIG. 14 includes the stator 412 and the rotor 414. The stator includes the plane opposed surface 413 along which the first voltage pattern 411 is established. The rotor includes the plane opposed surface 415 along which the second voltage pattern 417 is established. The rotor 414 is supported relative to the stator 412 so that the opposed surface 413 of the stator is spaced apart from the opposed surface 415 of the rotor by the spacing d.

The rotor 414 is supported so that it is free to move in the x-direction, but is constrained in the z-direction. The distance of the dotted curves representing the alternating voltage patterns 411 and 417 from the opposed surfaces 413 and 415, respectively, denotes the voltage vector of the alternating voltage pattern at that particular location. The two voltage patterns 411 and 417 are shown as having the same primary spatial wavelength A, though this does not need to be the case. Generally, each voltage pattern may include several spatial wavelengths. For the stator to exert an in-plane force on the rotor, the voltage patterns on the opposed surfaces of the stator and the rotor should have at least one spatial wavelength in common.

To step the rotor 414, the voltage controller 457 introduces a local disruption in at least one of the alternating voltage patterns 411 and 417. This generates an in-plane force that steps the rotor. An out-of-plane force is additionally exerted on the rotor. Similar to the embodiment described above with reference to FIG. 1, the relationship between the periodicity of the alternating voltage pattern and the spacing between the opposed surfaces 413 and 415 must be within a certain range to reduce the ratio of the out-of-plane force to the in-plane force to acceptable levels. In this embodiment, the periodicity of the alternating voltage pattern is characterized by the primary spatial wavelength $\lambda$. The ratio of the out-of-plane force to the in-plane force falls to a levels at which the forces are comparable when the ratio of the primary spatial wavelength to the spacing is less than 4.5, i.e., when the wavelength/-spacing ratio $\lambda/d<4.5$. When electrodes are used to establish the alternating voltage pattern, the resulting spatial wavelength is twice the pitch of the electrodes. Thus, the wavelength/spacing ratio of 4.5 corresponds to the above-mentioned pitch/spacing ratio of 2:25.

The primary spatial wavelengths of a more complex voltage pattern are determined using a spatial Fourier transform. Using a Fourier transform not only provides a way to quantify the characteristics of alternating voltage patterns established other than by electrodes, but also provides a way to calculate the forces between the rotor and the stator when the alternating voltage patterns are established by electrodes. For example, the plots shown in FIGS. 3 and 4 were calculated using Fourier transforms.

As a first example, the voltage pattern on the rotor of the embodiment shown in FIG. 1 can be analyzed in terms of the wavelength of the alternating voltage pattern on the opposed surfaces 13 and 15. If the alternating voltage pattern on one of the opposed surfaces is purely sinusoidal, the resulting voltage waveform includes only one spatial wavelength component having a wavelength of $\lambda$. However, in the embodiment shown in FIG. 1, the voltage patterns on the rotor and the stator are actually square waves, so that the waveform of the alternating voltage pattern includes components at multiple, harmonically related, wavelengths. The waveforms of the alternating voltage pattern can be considered as sums of sine waves. The sine wave with the lowest frequency and the largest magnitude, i.e., the fundamental, has a wavelength $\lambda=2p$. The higher harmonics have smaller amplitudes than the fundamental, and wavelengths of $2p/(2n+1)$, where n is an integer. The effect of the higher-frequency components must also be considered in determining the forces exerted on the rotor.

Any alternating voltage pattern can be analyzed into spatial frequency components at different spatial wavelengths using a Fourier transform. It is preferable to express the Fourier transform in terms of a spatial wavevector k, rather than in terms of the wavelength of a particular component. For a component with a wavelength $\lambda$, the associated spatial wavevector k has a magnitude of $2\pi/\lambda$.

The alternating voltage patterns and their corresponding Fourier transforms are described in mathematical terms as follows. The alternating voltage patterns in the direction of the x-axis on the opposed surface 413 of the stator 412 and the opposed surface 415 of the rotor 414 shown in FIG. 14 are denoted by $V_1(x)$ and $V_2(x)$, respectively. The associated Fourier transforms $\tilde{V}_1(k)$ and $\tilde{V}_2(k)$ are functions of the wavevector k. The k-axis is parallel to the x-axis. The Fourier transform of the alternating voltage pattern on the opposed surface 413 of the stator is determined using the following equation:

$$\tilde{V}_1(k) = \frac{1}{\sqrt{2\pi}} \int V_1(x)\exp(ikx)dx$$

The Fourier transform of the alternating voltage pattern on the opposed surface 415 of the rotor 414 is determined by the following equation:

$$\tilde{V}_2(k) = \frac{1}{\sqrt{2\pi}} \int V_2(x)\exp(ikx)dx$$

The Fourier transform of the alternating voltage pattern on the rotor electrodes 32–42 is sharply peaked at k=π/p, where p is the pitch of the electrodes. There are additional smaller peaks at k=π(2n+1)/p where n is an integer.

The more formal approach just described can be used to analyze more complex alternating voltage patterns to determine which spatial frequency components are present and to determine the relative magnitudes of the spatial frequency components. Complex alternating voltage patterns may have more than one primary spatial frequency component. The primary spatial frequency components of a complex alternating voltage pattern are defined as those spatial frequency components that have the largest amplitudes and that together constitute more than two-thirds of the energy of the original alternating voltage pattern.

An example of a complex alternating voltage pattern is that established on the opposed surface 13 of the stator 12 by the concatenated arrays of seven drive electrodes 16–28 with constant pitch $p_s$ shown in FIG. 7. In each drive array corresponding to the drive array 11, the voltage state of the electrodes corresponding to the electrodes 16, 20, 24 and 28 is high and the voltage state of the electrodes corresponding to the electrodes 18, 22, and 26 is low. The spatial frequency components of this alternating voltage pattern are less apparent than those of the alternating voltage pattern generated by the driven electrode array 17 on the opposed surface 15 of the rotor 14. When analyzed using the formal expression stated above, the resulting Fourier transform is sharply peaked at wavevectors k equal to $2\pi/7p_s$, $4\pi/7p_s$, $6\pi/7p_s$, $8\pi/7p_s$, $10\pi/7p_s$, $12\pi/7p_s$, . . . Using the relationship k=2π/λ between the wavevector and the spatial wavelength λ, the associated spatial wavelengths λ are $7p_s$, $7p_s/2$, $7p_s/3$, $7p_s/4$, $7p_s/5$, $7p_s/6$, . . . . The calculated relative amplitudes of the components are 0.2406, 0.3135, 0.7301, 0.5476, 0.1253, 0.0402, . . . , after normalization to make the sum of the squares of the amplitudes equal one. The sum of the squares of the amplitudes of the components having spatial wavelengths of $7p_s/3$ and $7p_s/4$ is 0.833. These two components together constitute more than two thirds of the energy of the original alternating voltage pattern, and are therefore the primary spatial frequency components.

As noted above, the out-of-plane force is reduced to a level at which it is comparable with the in-plane force when the ratio between the primary spatial wavelengths and the spacing d between the opposed surfaces of the rotor and the stator, i.e., λ/d, is less than 4.5.

At least one of the peaks in the Fourier transform $\tilde{V}_1(k)$ must coincide with at least one of the peaks in the Fourier transform $\tilde{V}_2(k)$ to generate an in-plane force between the rotor and the stator. To maximize the in-plane force, the pitch $p_r$ of the rotor electrodes must be chosen so that the primary spatial wavelength of the alternating voltage pattern on the rotor coincides with one of the two primary spatial wavelengths of the alternating voltage pattern on the stator, i.e., $2p_r=7p_s/3$ or $7p_s/4$. With the shorter of the primary spatial wavelengths of the alternating voltage pattern on the stator, this becomes $8p_r/4=7p_s/4$, or $8p_r=7p_s$. With the longer of the primary spatial wavelengths of the alternating voltage pattern on the stator, this becomes $6p_r/3=7p_s/4$, or $6p_r=7p_s$. This is the condition that governed the design of the electrostatic actuator shown in FIG. 1. While establishment of these relationships was illustrated above for seven stator electrodes, the relationships yield large in-plane forces and good stepping behavior for any odd number of stator electrodes.

The forces between the rotor and stator can be expressed in terms of the primary spatial wavelengths of the alternating voltage patterns on the opposed surface of each. This force calculation produces results similar to those shown in FIGS. 3 and 4 in which the alternating voltage patterns were generated using electrodes.

Figure 15:
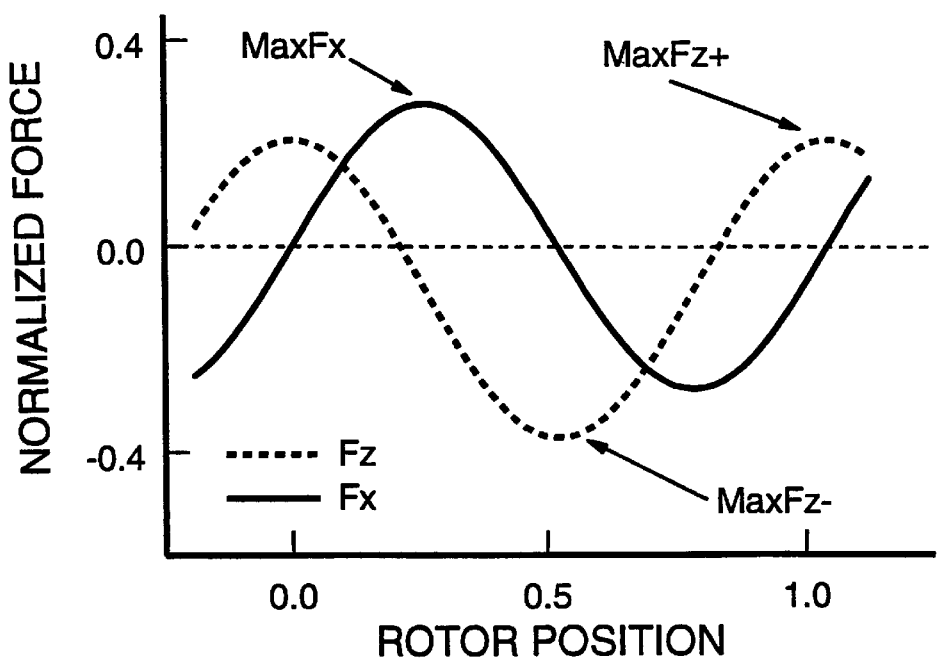
FIG. 15 is a plot of the normalized forces applied to the rotor of FIG. 14 as functions of the lateral position of the rotor.

In the actuator shown in FIG. 14, the alternating voltage patterns on the two opposed surfaces 413 and 415 are identical and have only one spatial wavelength λ. The forces exerted on the rotor 414 by the alternating voltage patterns shown in FIG. 14 are shown in FIG. 15 for the spatial wavelength/-spacing ratio, λ/d, of 4.5. Similar to the characteristics shown in FIGS. 3 and 4 for the alternating voltage pattern generated by electrodes located on the opposed surfaces 13 and 15 of the stator 12 and the rotor 14, respectively, the in-plane and out-of-plane forces vary sinusoidally with the rotor position. Negative values of the out-of-plane force $F_z$ indicate that the rotor is attracted towards the stator whereas positive values of $F_z$ indicate that the rotor is repelled from the stator. In FIG. 15, the maximum in-plane force applied to the rotor, $MaxF_x$, has nearly the same magnitude as the maximum out-of-plane attractive force, $MaxF_z-$. As noted above, the similar magnitudes of the in-plane and out-of-plane attractive forces is a significant benefit in micromachined devices because it reduces the aspect ratio of the beam flexures supporting the rotor. Low aspect ratio beam flexures reduce the processing complexity.

Figure 16:
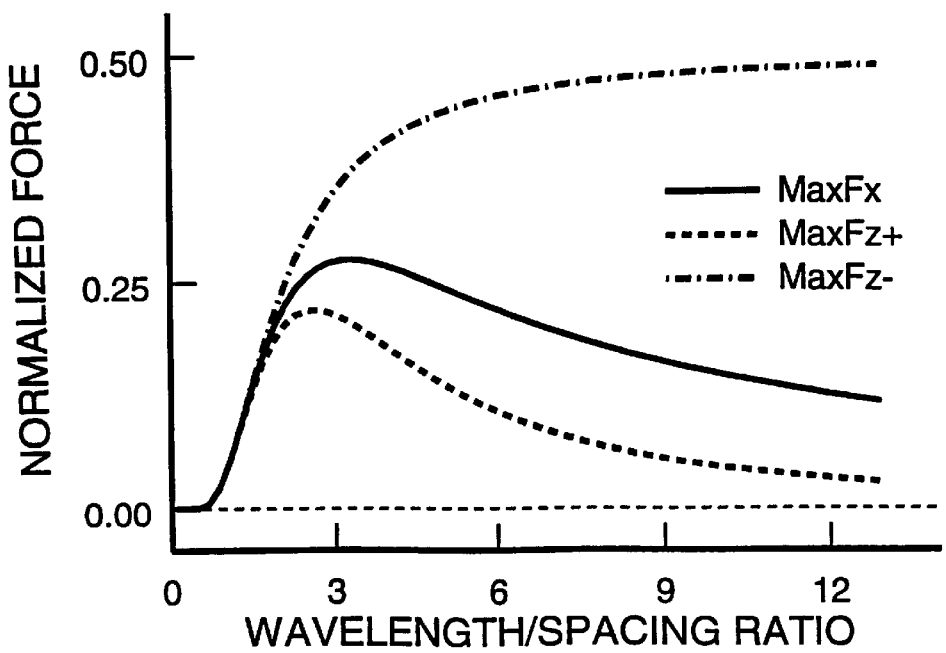
FIG. 16 is a plot of the three extrema from the force curves of FIG. 15 as functions of the spatial wavelength of the voltage patterns on the surfaces of the rotor and stator.

The in-plane and out-of-plane forces are dependent on the spacing d between the opposed surfaces 413 and 415 and the spatial wavelength λ of the voltage patterns on the stator 412 and on the rotor 414. The force versus in-plane position curves shown in FIG. 15 can be characterized by their extrema $MaxF_x$, $MaxF_z+$, and $MaxF_z-$. The behavior of these extrema as functions of the spatial wavelength/spacing ratio λ/d is shown in FIG. 16. In this Figure, the alternating voltage patterns are assumed to be identical on both the stator 412 and the rotor 414 and are assumed to have one spatial wavelength component.

The in-plane force $MaxF_x$ and the repulsive out-of-plane force $MaxF_z+$ are maximized only within a limited range of spatial wavelengths λ. These maxima appear at a spatial wavelength/spacing ratio of approximately three. Therefore, to build an actuator with the largest in-plane force for a predetermined drive voltage and a predetermined spacing between the opposed surfaces of the stator and the rotor, the Fourier transforms of the voltage patterns on the two opposed surfaces should be substantially centered around spatial wavelengths which provide a spatial wavelength/spacing ratio of about three.

In certain applications, the ratio of the out-of-plane force to the in-plane force may be more important than the magnitude of the in-plane force for a given drive voltage. The ratio of the out-of-plane force to the in-plane force is large when the spatial wavelength/spacing ratio, λ/d, is large. A large spatial wavelength/spacing ratio may result when large electrodes with a large pitch are used. Such electrodes are simpler and cheaper to make than small electrodes with a small pitch. FIG. 15 shows that the ratio of the out-of-plane force to the in-plane force is much greater than unity when the spatial wavelength/spacing ratio, λ/d, is greater than 16. The force ratio reduces to less than two as the spatial wavelength/spacing ratio becomes less than 4.5. The force ratio is about unity when the wavelength/spacing ratio is less than two.

For micromachined actuators, having a low ratio of the out-of-plane force to the in-plane force is particularly important because a low force ratio enables the folded beam flexures that support the rotor to have an aspect ratio that is easy to fabricate. For example, in a typical advanced memory application, the total travel of the rotor may be about 50 µm and the spacing d between the rotor and stator may have to be maintained to within an accuracy of about 0.1 µm. If a conventional rotor is used, in which all the electrodes are held at the same voltage, then the out-of-plane to in-plane force ratio is nearly 10. To support such a rotor requires folded beam flexures having an aspect ratio of at least 50:1, i.e., the height of the folded beams in the z-direction must be at least fifty times larger than the width in the x-direction. Folded beams with such a large aspect ration are extremely difficult using current fabrication techniques. However, if the alternating voltage patterns shown in FIG. 14 are established on the opposed surfaces 13 and 15 of the rotor and the stator, and the spatial wavelength/spacing ratio is less than 4.5, then the ratio of the out-of-plane force to the in-plane force is less than about 1.6. In this case, the rotor can be supported with the required accuracy in the z-direction using folded beam flexures having an aspect ratio of about 20. Structures with this aspect ratio are simple to make using current fabrication techniques.

Although this disclosure describes illustrative embodiments of the invention in detail, it is to be understood that the invention is not limited to the precise embodiments described, and that various modifications may be practiced within the scope of the invention defined by the appended claims.

We claim:

1. A method of driving an electrostatic actuator, the method comprising:

providing a first member and a second member, each of the first member and the second member including an opposed surface;

providing a bending flexure, using the bending flexure to support the opposed surface of the first member opposite the opposed surface of the second member with a spacing of d, and to allow one of the first member and the second member to move relative to the other in a direction parallel to the opposed surfaces;

establishing a spatially substantially alternating voltage pattern on the opposed surface of the first member, and a static, spatially substantially alternating voltage pattern on the opposed surface of the second member, each spatially substantially alternating voltage pattern defining a waveform having a primary spatial wavelength $\lambda$ satisfying the spatial wavelength/spacing condition $\lambda/d<16$; and selectively imposing a variation on the spatially substantially alternating voltage pattern on the opposed surface of the first member to move the one of the first member and the second member relative to the other.

2. The method of claim 1, in which, in the step of selectively imposing a variation on the spatially substantially alternating voltage pattern on the opposed surface of the first member, a local disruption is imposed on the spatially substantially alternating voltage pattern to step the one of the first member and the second member relative to the other.

3. The method of claim 2, additionally comprising incrementally moving the local disruption through the drive array to step the one of the first member and the second member incrementally by repetitively performing a step of changing a voltage state of an electrode adjacent an electrode that was switched in an immediately preceding step.

4. The method of claim 1, in which:

in the step of establishing a spatially substantially alternating voltage pattern on the opposed surface of the first member and a static, spatially substantially alternating voltage pattern on the opposed surface of the second member:

the spatially substantially alternating voltage patterns have voltage maxima located opposite one another, and the spatially substantially alternating voltage pattern established on the opposed surface of the first member additionally has voltage minima; and the step of selectively imposing a variation on the spatially substantially alternating voltage pattern on the opposed surface of the first member includes varying one of the voltage maxima and the voltage minima of the spatially substantially alternating voltage pattern.

5. The method of claim 2, in which:

in the step of establishing a spatially substantially alternating voltage pattern on the opposed surface of each of the first member and the second member, a spatially substantially alternating voltage pattern having two voltage states is established; and the step of selectively imposing a local disruption in the spatially substantially alternating voltage pattern on the opposed surface of the first member includes changing one of the two voltage states at a selected location in the voltage pattern to a voltage state intermediate between the two voltage states.

6. The method of claim 2, in which:

in the step of establishing a spatially substantially alternating voltage pattern on the opposed surface of each of the first member and the second member, a spatially substantially alternating voltage pattern having two voltage states is established; and the step of selectively imposing a local disruption in the spatially substantially alternating voltage pattern on the opposed surface of the first member includes repetitively switching a selected location in the spatially substantially alternating voltage pattern between the two voltage states.

7. The method of claim 1, in which, in the step of establishing a spatially substantially alternating voltage pattern on the opposed surface of each of the first member and the second member, each spatially substantially alternating voltage pattern defines a waveform having a primary spatial wavelength $\lambda$ satisfying the spatial wavelength/spacing condition $\lambda/d<4.5$.

* * * * *